(12) United States Patent
Kurihara et al.

(10) Patent No.: US 6,620,516 B1
(45) Date of Patent: Sep. 16, 2003

(54) ORGANIC DOMAIN/INORGANIC DOMAIN COMPOSITE MATERIAL

(75) Inventors: Masaaki Kurihara, Numazu (JP); Hiroyoshi Matsuyama, Fuji (JP)

(73) Assignee: Asahi Kasei Kabushiki Kaisha, Osaka (JP)

(*) Notice: Subject to any disclaimer, the term of this patent is extended or adjusted under 35 U.S.C. 154(b) by 0 days.

(21) Appl. No.: 10/049,525

(22) PCT Filed: Aug. 14, 2000

(86) PCT No.: PCT/JP00/05449
§ 371 (c)(1),
(2), (4) Date: Feb. 13, 2002

(87) PCT Pub. No.: WO01/12726
PCT Pub. Date: Feb. 22, 2001

(30) Foreign Application Priority Data

Aug. 13, 1999 (JP) .............................. 11-229116

(51) Int. Cl.[7] .................................. B32B 9/04
(52) U.S. Cl. .................... 428/447; 528/25; 528/26; 528/29; 528/30; 528/39; 428/451
(58) Field of Search .................... 528/25, 26, 29, 528/30, 39; 428/447, 451

(56) References Cited

U.S. PATENT DOCUMENTS

| | | |
|---|---|---|
| 4,702,861 A | 10/1987 | Farnum |
| 5,721,295 A | 2/1998 | Bruggemann et al. |
| 6,107,396 A * | 8/2000 | Kweon et al. ............ 524/779 |
| 6,337,370 B1 * | 1/2002 | Bae et al. ............... 525/61 |
| 2002/0192476 A1 * | 12/2002 | Kambe et al. .......... 428/447 |

FOREIGN PATENT DOCUMENTS

| | | |
|---|---|---|
| JP | 53-95125 A | 8/1978 |
| JP | 56-143244 A | 11/1981 |
| JP | 64-36661 A | 2/1989 |
| JP | 8-85748 A | 4/1996 |
| JP | 10-330749 A | 12/1998 |
| JP | 11310720 A * | 11/1999 ......... C08L/101/02 |
| JP | 2000-51690 A | 2/2000 |

OTHER PUBLICATIONS

Orefice et al., "Novel Multicomponent Silicate–Poly(vinyl alcohol) Hybrids with Controlled Reactivity"; Journal of Non–Crystalline Solids, 2000, 273, 180–185.*
Usuki, A. et al., J. Mater. Res., vol. 8, No. 5, pp. 1179–1184, (May 1993).
Novak, Bruce M., Adv. Materials, vol. 5, No. 6, pp. 422–433, (1993).
Polymeric Materials, Edited by J.C. Salamone, vol. 6, CRC Press, Section by Chujo, Y., pp. 4793–4798, (1996).
Matsuyama, H. et al., Chem. Mater., vol. 11, pp. 16–19, (1999).
Matsuyama, H. et al., J. Mater. Res., vol. 14, No. 8, pp. 3379–3388, (1999).
Matsuyama, H. et al., J. Mater. Res., vol. 14, No. 8, pp. 3389–3396, (1999).
Matsuyama, H. et al., Concrete Sci. and Eng., vol. 1, pp. 66–75, (1999).
Matsuyama, H. et al., Concrete Sci and Eng., vol. 1, pp. 148–156, (1999).

* cited by examiner

*Primary Examiner*—Robert Dawson
*Assistant Examiner*—Marc S Zimmer
(74) *Attorney, Agent, or Firm*—Birch, Stewart, Kolasch & Birch, LLP

(57) ABSTRACT

Disclosed is an organic domain/inorganic domain hybrid material comprising: an organic domain comprising at least one water-soluble or water-dispersible organic polymer having a plurality of functional groups, and an inorganic domain, the organic domain and the inorganic domain being ionically bonded to each other through the functional groups of the organic polymer to form an ionically crosslinked structure, the inorganic domain comprising a plurality of inorganic bridges, each of which independently comprises at least one silicon atom, at least two oxygen atoms and at least two divalent metal atoms, wherein the weight ratio of the organic domain to the inorganic domain is at least 1.0.

9 Claims, 4 Drawing Sheets

ORGANIC DOMAIN/INORGANIC DOMAIN COMPOSITE MATERIAL

This application is the national phase under 35 U.S.C. §371 of PCT International Application No. PCT/JP00/05449 which has an International filing date of Aug. 14, 2000, which designated the United States of America.

BACKGROUND OF THE INVENTION

1. Field of the Invention

The present invention relates to an organic domain/inorganic domain hybrid material. More particularly, the present invention is concerned with an organic domain/inorganic domain hybrid material comprising: an organic domain comprising at least one water-soluble or water-dispersible organic polymer having functional groups, and an inorganic domain, the organic domain and the inorganic domain being ionically bonded to each other though the functional groups of the organic polymer to form an ionically crosslinked structure, the inorganic domain comprising inorganic bridges, each of which independently comprises at least one silicon (Si) atom, at least two oxygen (O) atoms and at least two divalent metal atoms, wherein the silicon atom(s) and the oxygen atoms together form at least one —O—Si—O— linkage which is arranged longitudinally of the inorganic bridge, wherein each terminal of the inorganic bridge comprises the divalent metal atom, wherein the divalent metal atom is ionically bonded to the —O—Si—O— linkage of the inorganic bridge and to the functional group of the organic polymer, wherein the weight ratio of the organic domain to the inorganic domain is at least 1.0. The organic domain/inorganic domain hybrid material of the present invention is advantageous not only in that the material exhibits excellent water absorptivity, but also in that the material exhibits a characteristic wherein decomposition and regeneration of the material occur depending on pH (hereinafter, such a characteristic is frequently referred to as "pH-response property"), so that the material can be easily decomposed into the components thereof. Therefore, when the hybrid material of the present invention is used as a water absorptive material and the like, not only can the material after use be easily disposed by decomposing the material, but also the components obtained by decomposition of the material can be easily recycled, so that the hybrid material is advantageous from the viewpoint of prevention of environmental destruction and efficient utilization of resources.

2. Prior Art

Organic polymeric materials having excellent hydrophilicity have been widely used in the fields related to disposable diapers, sanitary products and the like, and the amount of use of such materials has been increasing. However, these hydrophilic polymeric materials generally become gels after use and, hence, currently, the materials (in the form of gels) after use are disposed by incineration. Therefore, from the viewpoint of the protection of environment and efficient utilization of resources, it has been expected to develop simple and economical methods for disposal and recycling of the materials.

Generally, with respect to the water absorptive materials composed only of organic polymers, the organic polymers are crosslinked through organic chemical bonds. Therefore, it has been difficult not only to decompose the materials into polymer chains, but also to regenerate the decomposed materials.

Recently, vigorous studies have been made on hybrid materials comprising a combination of at least two materials having different properties, because such hybrid materials exhibit excellent properties which cannot be obtained by a single material. Particularly, hybrid materials comprising a combination of an organic polymeric material and an inorganic material have been attracting much attention. Especially, the so-called "nano-composite material" comprising a hybrid of an organic polymeric material and an inorganic material, in which one of the organic polymeric material and the inorganic material is present in the form of nanometer-size domains, exhibits novel properties ascribed to its unique structure, and, hence, the development of applications of such nano-composite material is expected.

As examples of widely known nano-composite materials, there can be mentioned a hybrid material obtained by uniformly dispersing a lamellar silicate (e.g., clay) as an inorganic material in a polyamide resin as an organic polymeric material (see A. Usuki et al., J. Mater. Res., 8, [5], 1179 (1993)) and a material composed mainly of silica or composed mainly of an organic molecule, in which respective nano-size particles of silica and an organic molecule are mutually. finely dispersed, and which is produced by subjecting a silicon alkoxide as a raw material to sol-gel process in the presence of an organic molecule (oligomer or polymer) to form a silica (see Novak, M., Adv. Mater. 5,422 (1993) and Chujo, Y., and Encyclp. Poly. Sci. Tech., CRC Press, Boca Raton, 6, 4793 (1996)). In these documents, it is described to improve the mechanical properties of nano-composite materials or to produce an intermediate of a porous silica; however, these documents do not disclose a technique to produce a hybrid material exhibiting a high hydrophilicity.

Therefore, studies have been made to produce a hybrid material having a high hydrophilicity. For example, a hybrid material composed mainly of an inorganic material, in which a water-soluble polymer (such as polyacrylic acid or polymethacrylic acid) is intercalated between the layers of calcium silicate hydrate, has been developed (see H. Matsuyama et al., Chemistry of Materials, 11, [1], 16–19 (1999)). With respect to this hybrid material, the hybrid material which has absorbed water can be liquefied by adjusting the pH of the hybrid material to a high acidity side, so that decomposition of the material and recycling of the components obtained by decomposition of the material can be easily conducted. The material also has hydrophilicity. However, even when the hybrid material is produced using a large amount of water-soluble polymer, a part of the water-soluble polymer does not participate in the reaction for forming the hybrid material, so that the organic polymeric material/calcium silicate hydrate weight ratio of the hybrid material becomes less than 1 and, hence, the hybrid material does not exhibit satisfactory water absorptivity.

Further, with respect to a hybrid material exhibiting water absorptivity, Unexamined Japanese Patent Laid-Open Specification No. 12-051690 discloses, as a material for absorbing a salt-containing liquid, a hybrid material composed of a water-soluble polymer and clay or a synthetic calcium silicate. In the hybrid material obtained by the technique of the this patent document, the water-soluble polymer and the inorganic material (clay or a synthetic calcium silicate) are present in the form of a mixture of micro-size particles of the water-soluble polymer and the inorganic material; however, an extremely small amount of chemical linkages are formed between the polymer and the inorganic material. Specifically, the amount of the polymer chemically bonded to the inorganic material is less than 1 in terms of the weight ratio of the polymer (chemically bonded to the inorganic material) to the inorganic material. Further, in this hybrid material, the formation of the dispersion of the micro or nanosize inorganic material particles is not sufficient for the hybrid material to become transparent when the hybrid has absorbed water. Therefore, by the technique of this prior art document, it is impossible to obtain a hybrid material having excellent pH-response property (i.e., property to respond quickly to the change of pH) as well as high water absorptivity.

Further, for the purpose of developing an organic polymer type ameliorant for soil. Unexamined Japanese Patent Laid-Open Specification No. 10-330749 discloses a technique in which silicon is introduced into a water-soluble polymer by forming a covalent bond between the polymer and silicon, and the resultant silicon/polymer hybrid is crosslinked with calcium or the like. However, this technique only intends to obtain a material having excellent acid resistance and alkali resistance, and the material obtained by this technique does not exhibit a pH-response property.

SUMMARY OF INVENTION

In this situation, the present inventors have made extensive and intensive studies with a view toward developing a hybrid material exhibiting not only high water absorptivity but also excellent pH-response property. As a result, it has unexpectedly been found that such an objective can be attained by an organic domain/inorganic domain hybrid material comprising: an organic domain comprising a water-soluble or water-dispersible organic polymer having functional groups, and an inorganic domain, the organic domain and the inorganic domain being ionically bonded to each other though the functional groups of the organic polymer to form an ionically crosslinked structure, the inorganic domain comprising inorganic bridges, each of which independently comprises at least one silicon (Si) atom, at least two oxygen (O) atoms and at least two divalent metal atoms, wherein the silicon atom(s) and the oxygen atoms together form at least one —O—Si—O— linkage which is arranged longitudinally of the inorganic bridge, wherein each terminal of the inorganic bridge comprises the divalent metal atom, wherein the divalent metal atom is ionically bonded to the —O—Si—O— linkage of the inorganic bridge and to the functional group of the organic polymer, wherein the weight ratio of the organic domain to the inorganic domain is at least 1.0. The present inventors have also found that the coating obtained from the above-mentioned hybrid material exhibits a very high hydrophilicity.

Further, the present inventors have also found that a hydrophilic coating which exhibits a very high hydrophilicity can be realized by a hydrophilic, double-layer coating comprising a lower organic layer comprised of a water-dispersible organic polymer having functional groups, and an upper inorganic layer formed over the lower organic layer, wherein the inorganic layer comprises inorganic molecules selected from the group consisting of inorganic ring-forming molecules and inorganic free-end molecules, each of which has substantially the same structure as that of the inorganic bridge of the inorganic domain of the above-mentioned hybrid material.

The present invention has been completed, based on these novel findings.

Accordingly, it is an object of the present invention to provide an organic domain/inorganic domain hybrid material which is advantageous not only in that the material exhibits excellent water absorptivity, but also in that the material exhibits a pH-response property and, hence, can be easily decomposed into the components thereof, so that the hybrid material is advantageous from the viewpoint of prevention of environmental destruction and efficient utilization of resources in that, when the material is used as a water absorptive material and the like, not only can the material after use be easily disposed by decomposing the material, but also the components obtained by decomposition of the material can be easily recycled.

It is another object of the present invention to provide a coating exhibiting a very high hydrophilicity.

The foregoing and other objects, features and advantages of the present invention will be apparent from the following detailed description and appended claims taken in connection with the accompanying drawings.

BRIEF DESCRIPTION OF THE DRAWINGS

In the drawings:

In FIGS. 1 through 4, M denotes a divalent metal atom.

DETAILED DESCRIPTION OF THE INVENTION

Figure 1:
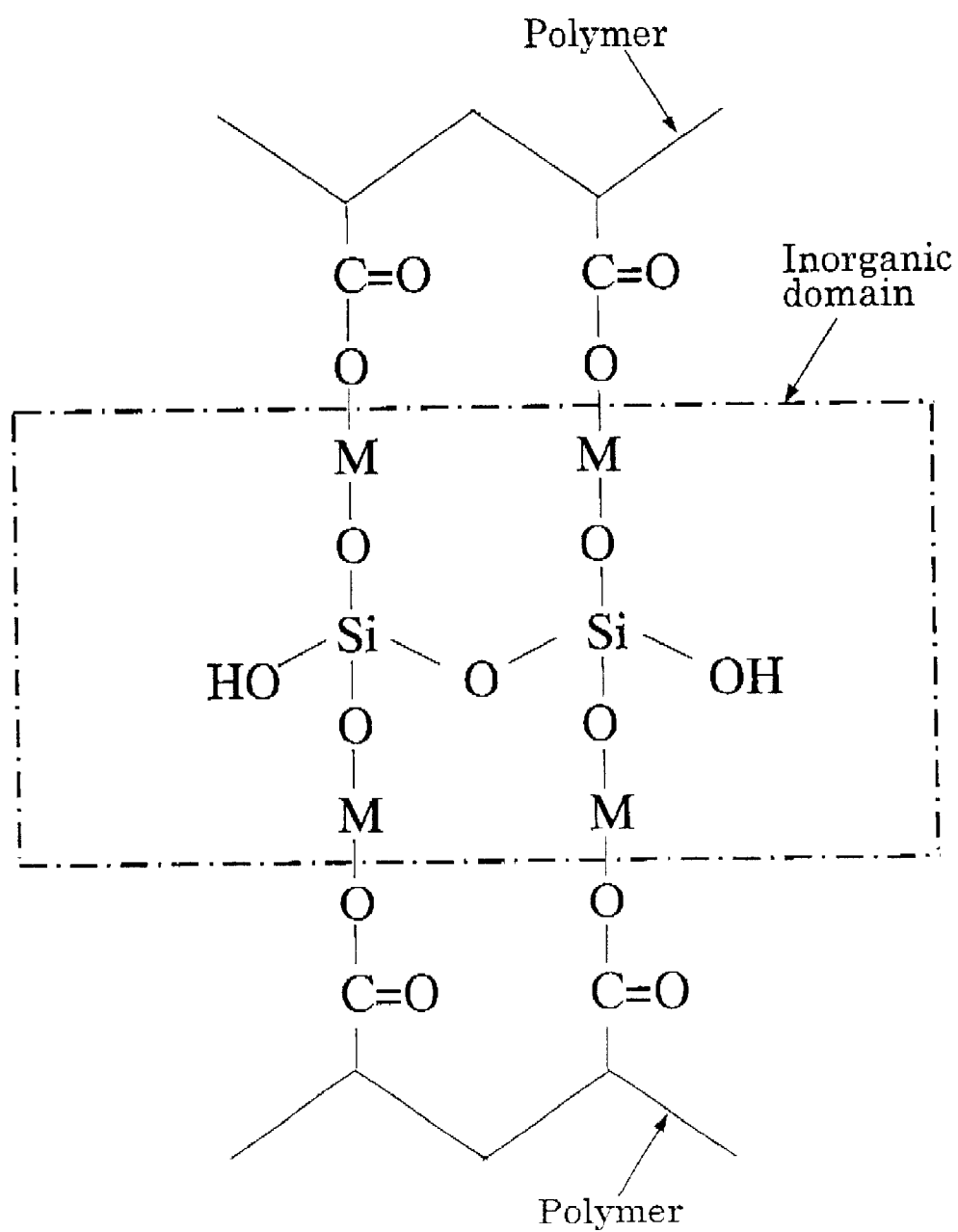
FIG. 1 is an explanatory diagram showing the structure of one embodiment of the organic domain/inorganic domain hybrid material of the present invention.

According to the present invention, there is provided an organic domain/inorganic domain hybrid material comprising:

an organic domain comprising at least one water-soluble or water-dispersible organic polymer having a plurality of functional groups selected from the group consisting of anionic functional groups and nonionic functional groups and optionally having at least one cationic functional group, and an inorganic domain, the organic domain and the inorganic domain are ionically bonded to each other through the functional groups of the organic polymer to form an ionically crosslinked structure, the inorganic domain comprising a plurality of inorganic bridges, each of which independently comprises at least one silicon (Si) atom, at least two oxygen (O) atoms and at least two divalent metal atoms, wherein the at least one silicon atom and the at least two oxygen atoms together form at least one —O—Si—O— linkage, in which the at least one —O—Si—O— linkage is arranged longitudinally of the inorganic bridge, wherein each terminal of the inorganic bridge comprises the divalent metal atom, wherein the divalent metal atom is ionically bonded to the —O—Si—O— linkage of the inorganic bridge and to the functional group of the organic polymer, so that the ionically crosslinked structure is formed, wherein, when the inorganic bridge comprises at least two —O—Si—O— linkages, the two —O—Si—O— linkages optionally have a divalent metal atom which is positioned therebetween and which is ionically bonded to oxygen atoms of the —O—Si—O— linkages positioned adjacently to the divalent metal atom, respectively, wherein laterally, mutually adjacent inorganic bridges of the plurality of inorganic bridges are optionally linked to each other at their respective silicon atoms through at least an oxygen atom, and wherein the weight ratio of the organic domain to the inorganic domain is at least 1.0.

For easy understanding of the present invention, the essential features and various preferred embodiments of the present invention are enumerated below.

1. An organic domain/inorganic domain hybrid material comprising:

an organic domain comprising at least one water-soluble or water-dispersible organic polymer having a plurality of functional groups selected from the group consisting of anionic functional groups and nonlonic functional groups and optionally having at least one cationic functional group, and inorganic domain, the organic domain and the inorganic domain are ionically bonded to each other through the functional groups of the organic polymer to form an ionically crosslinked structure, the inorganic domain comprising a plurality of inorganic bridges, each of which independently comprises at least one silicon (Si) atom, at least two oxygen (O) atoms and at least two divalent metal atoms, wherein the at least one silicon atom and the at least two oxygen atoms together form at least one —O—Si—O— linkage, in which the at least one —O—Si—O— linkage is arranged longitudinally of the inorganic bridge, wherein each terminal of the inorganic bridge comprises the divalent metal atom, wherein the divalent metal atom is ionically bonded to the —O—Si—o— linkage of the inorganic bridge and to the functional group of the organic polymer, so that the ionically crosslinked structure is formed, wherein, when the inorganic bridge comprises at least two —O—Si—O— linkages, the two —O—Si—O— linkages optionally have a divalent metal atom which is positioned therebetween and which is ionically bonded to oxygen atoms of the —O—Si—O— linkages positioned adjacently to the divalent metal atom, respectively, wherein laterally, mutually adjacent inorganic bridges of the plurality of inorganic bridges are optionally linked to each other at their respective silicon atoms through at least an oxygen atom, and wherein the weight ratio of the organic domain to the inorganic domain is at least 1.0.

2. The hybrid material according to item 1 above, wherein the functional groups of the organic polymer are anionic functional groups selected from the group consisting of a carboxylic acid group or a salt thereof, a sulfonic acid group or a salt thereof, a phosphoric acid group or a salt thereof and mixtures thereof.

3. The hybrid material according to item 1 or 2 above, wherein the inorganic domain has a size of 100 nm or less in terms of the length of the long axis of the inorganic domain.

4. The hybrid material according to any one of items 1 to 3 above, which is substantially transparent when the hybrid material has water mixed therewith in an amount which is 9 times as large as the dry weight of the hybrid material.

5. The hybrid material according to any one of items 1 to 4 above, wherein the divalent metal atoms are alkaline earth metal atoms.

6. The hybrid material according to any one of items 1 to 5 above, wherein 1 to 15 atomic % of the silicon atoms are replaced by aluminum atoms.

7. The hybrid material according to any one of items 1 to 6 above, which is produced by a process comprising contacting, in the presence of an aqueous medium and at a pH of 7 or more, the following chemical species (a), (b), (c) and optionally (d) with each other;

(a) silicate anions formed from a silicate compound or a silicon halide, (b) polymer anions formed from a water-soluble or water-dispersible organic polymer having a plurality of functional groups selected from the group consisting of anionic functional groups and nonionic functional groups and optionally having at least one cationic functional group.

(c) divalent metal cations formed from a divalent metal salt, and optionally (d) aluminate anions formed from an aluminum compound.

8. A hydrophilic coating comprising the hybrid material of any one of items 1 to 7 above.

9. A hydrophilic coating comprising:

a lower organic layer comprised of a water-dispersible organic polymer having a plurality of functional groups selected from the group consisting of anionic functional groups and nonionic functional groups and optionally having at least one cationic functional group, and an upper inorganic layer which is formed over the organic layer, wherein the inorganic layer comprises a plurality of inorganic molecules selected from the group consisting of inorganic ring-forming molecules and inorganic free-end molecules, each of the inorganic ring-forming molecules independently comprising at least one silicon (Si) atom, at least two oxygen (O) atoms and at least two divalent metal atoms, wherein the at least one silicon atom and the at least two oxygen atoms together form at least one —O—Si—O— linkage, and in which the at least one —O—Si—O— linkage is arranged longitudinally of the inorganic ring-forming molecule, wherein each terminal of the inorganic ring-forming molecule comprises the divalent metal atom, wherein the divalent metal atom is ionically bonded to the —O—Si—O— linkage of the inorganic ring-forming molecule and to the functional group of the organic polymer, wherein, when the inorganic ring-forming molecule comprises at least two —O—Si—O— linkages, the two —O—Si—O— linkages optionally have a divalent metal atom which is positioned therebetween and which is ionically bonded to oxygen atoms of the —O—Si—O— linkages positioned adjacently to the divalent metal atom, respectively, and each of the inorganic free-end molecules independently comprising at least one silicon (Si) atom, at least two oxygen (O) atoms and at least one divalent metal atom, wherein the at least one silicon atom and the at least two oxygen atoms together form at least one —O—Si—O— linkage, in which the at least one —O—Si—O— linkage is arranged longitudinally of the inorganic free-end molecule, wherein a non-freeend terminal of the inorganic free-end molecule comprises the divalent metal atom, wherein the divalent metal atom is ionically bonded to the —O—Si—O— linkage of the inorganic free-end molecule and to the functional group of the organic polymer, wherein, when the inorganic free-end molecule comprises at least two —O—Si—O— linkages, the two —O—Si—O— linkages optionally have a divalent metal atom which is positioned therebetween and which is ionically bonded to oxygen atoms of the —O—Si—O— linkages positioned adjacently to the divalent metal atom, respectively, and wherein laterally, mutually adjacent inorganic molecules of the plurality of inorganic molecules are optionally linked to each other at their respective silicon atoms through at least an oxygen atom.

Hereinbelow, the present invention is described in detail.

The organic domain/inorganic domain hybrid material of the present invention comprises: an organic domain comprising a water-soluble or water-dispersible organic polymer having a plurality of functional groups selected from the group consisting of anionic functional groups and nonionic functional groups and optionally having at least one cationic functional group; and an inorganic domain, wherein the organic domain and the inorganic domain are ionically bonded to each other through the functional groups of the organic polymer to form an ionically crosslinked structure.

The water-soluble organic polymer used in the hybrid material of the present invention is a polymer which exhibits a solubility of 1% by weight or more in a water-containing solvent having a water content of 50% by weight or more, as measured at room temperature. With respect to the conditions for dissolving the organic polymer in the solvent, there is no particular limitation so long as the organic polymer exhibits the above-mentioned solubility. For example, a polyvinyl alcohol gets dissolved in water only at a high temperature; however, once the polyvinyl alcohol gets dissolved in water at a high temperature, the polyvinyl alcohol remains dissolved in water even after the temperature is lowered to room temperature. Therefore, in the present invention, the polyvinyl alcohol is regarded as a organic polymer which exhibits the above-mentioned solubility and, hence, can be used as the water-soluble organic polymer.

With respect to the water-containing solvent mentioned above, there is no particular limitation so long as the solvent has a water content of 50% by weight at room temperature. When the solvent is in the form of a mixture of water with other substances, the solvent needs to be in the form of a uniform mixture. Examples of other substances include water-soluble solvents, such as alcohols, ketones, esters, dimethylformamide and dimethylsulfoxide; inorganic or organic acids, such as hydrochloric acid, sulfuric acid, acetic acid and p-toluenesulfonic acid; inorganic or organic salts, such as sodium chloride and sodium acetate; alkalis, such as an alkali metal hydroxide, ammonia and an amine; and surfactants, such as nonionic, anionic, cationic and silicone-containing surfactants.

The water-soluble or water-dispersible organic polymer has a plurality of functional groups selected from the group consisting of anionic functional groups and nonionic functional groups and optionally having at least one cationic functional group. Preferred examples of anionic functional groups include a carboxylic acid group or a salt thereof, a sulfonic acid group or a salt thereof, a phosphoric acid group or a salt thereof and mixtures thereof. Preferred examples of nonionic functional groups include a hydroxyl group. These functional groups of the organic polymer are bonded to —O—Si—O— linkages (of the inorganic bridges of the inorganic domain) through divalent metal atoms to form the above-mentioned ionically crosslinked structure. By virtue of this ionically crosslinked structure, the hybrid material of the present invention exhibits not only excellent pH-response property but also high water absorptivity. Especially, such advantageous effects become remarkable when the functional groups of the organic polymer are anionic functional groups selected from the group consisting of a carboxylic acid group or a salt thereof, a sulfonic acid group or a salt thereof, and a phosphoric acid group or a salt thereof. The most preferred functional group is a carboxylic acid group or a salt thereof. In the case of the nonionic functional groups, the reason why the nonionic functional groups can be used for forming the above-mentioned crosslinked structure is considered to be as follows. For example, when hydroxyl groups are used as the nonionic functional groups, the hydroxyl groups are ionized in alkaline atmosphere, so that the above-mentioned ionically crosslinked structure can be formed.

The organic polymer used in the production of the hybrid material of the present invention generally has at least one functional group in terms of an average number of the functional group per polymer chain of the organic polymer. The organic polymer may contain a polymer chain having no functional group; however, it is preferred that each polymer chain has at least one functional group.

Examples of water-soluble organic polymers include homopolymers or copolymers, which are obtained by polymerizing at least one anionic or nonionic functional group-containing monomer selected from the group consisting of vinyl alcohol, 2-hydroxyethyl (meth)acrylate, 2-hydroxypropyl (meth)acrylate, 2-hydroxybutyl (meth)acrylate, glycerol mono(meth)acrylate, and (meth)acrylic acid and an alkali metal salt or ammonium salt thereof; itaconic acid and an alkali metal salt or ammonium salt thereof; 2-(meth)acryloyloxyethylsuccinic acid and an alkali metal salt or ammonium salt thereof; 2-(meth) acryloyloxyethylphthalic acid and an alkali metal salt or ammonium salt thereof; 2-(meth) acryloyloxyethylhexahydrophthalic acid and an alkali metal salt or ammonium salt thereof; 2-(meth)acrylamide-2-methylpropanesulfonic acid and salts thereof; styrenesulfonic acid and salts thereof; vinylsulfonic acid and salts thereof; 2-sulfoethyl (meth)acrylate and salts thereof; and 2-(meth)acryloyloxyethylphosphoric acid and salts thereof. Further examples of water-soluble organic polymers include copolymers obtained by copolymerizing at least one of the above-mentioned monomers with at least one comonomer selected from the group consisting of a quaternization reaction product of dimethylaminoethyl (meth)acrylate, (meth)acrylamide, (meth)acryloylmorpholine, vinylpyridine, N-methyl-(meth)acrylamide, N,N'-dimethyl(meth)acrylamide, N,N'-dimethylaminopropyl(meth)acrylamide, N,N'-dimethyl-aminoethyl (meth)acrylate, N,N'-diethylaminoethyl (meth)acrylate, N,N'-dimethylaminoneopentyl (meth)acrylate, N-vinyl-2-pyrrolidone, diacetonacrylamide, N-methylol(meth)acrylamide, methoxytriethylene glycol (meth)acrylate, methoxytetraethylene glycol (meth)acrylate, methoxypolyethylene glycol (meth)acrylate (number average molecular weight of polyethylene glycol=400), methoxypolyethylene glycol (meth)acrylate (number average molecular weight of polyethylene glycol=1,000), butoxyethyl (meth)-acrylate, phenoxyethyl (meth)acrylate, phenoxydiethylene glycol (meth)acrylate, phenoxyethylene glycol (meth)acrylate, phenoxypolyethylene glycol (meth)-acrylate, nonylphenoxyethyl (meth)acrylate, isobornyl (meth)acrylate, lauryl (meth)acrylate, tridecyl (meth)acrylate, stearyl (meth)acrylate, isodecyl (meth)acrylate, cyclohexyl (meth)acrylate, tetrafurfuryl (meth)acrylate, benzyl (meth)acrylate, methyl (meth)acryalte, ethyl (meth)acryalte, styrene and the like. These polymers need to exhibit the above-mentioned solubility in the water-containing solvent.

Polymers other than the above-exemplified organic polymers can also be used so long as the polymers exhibit water-dispersibility or the above-mentioned solubility and have the above-mentioned functional groups. Examples of such polymers include natural polymers, e.g., polysaccharides (such as salts of alginic acid or derivatives thereof and cellulose derivatives), gum arabic, gelatin and the like; polyvinyl alcohol and a partially saponified product thereof; polymers (such as a partially hydrolyzed product of polyacrylamide) to which functional groups are introduced after the polymerization; polymers (such as a homopolymer or copolymer of glycidol) obtained by cationic polymerization; polyurethane, polyurea, polyamide and the like which have been rendered water-soluble or water-dispersible by introduction of functional groups.

In the present invention, the water-dispersible organic polymer means an organic polymer which can be dispersed in an aqueous medium in the form of organic polymer particles. The average particle size of such organic polymer particles is generally in the range of from 1 to 2,000 nm, preferably from 10 to 1,000 nm, more preferably from 10 to 500 nm. From the viewpoint of increasing the transparency exhibited by the hybrid material of the present invention when the hybrid material has absorbed water or has been mixed with water, the most preferred average particle size is in the range of from 10 to 100 nm. With respect to the method for producing the water-dispersible organic polymer, there is no particular limitation. For example, the water-dispersible organic polymer can be produced by a method in which, in an aqueous medium, an anionic functional group-containing monomer (such as (meth)acrylic acid or a salt thereof, itaconic acid or a salt thereof, fumaric acid or a salt thereof, maleic acid or a salt thereof, crotonic acid or a salt thereof, maleic anhydride, a half ester of itaconic acid or a salt thereof, a half ester of maleic acid or a salt thereof, styrene-sulfonic acid or a salt thereof, or allylsulfosuccinic acid) or a nonionic group-containing monomer (such as hydroxyethyl (meth)acrylate, hydroxypropyl (meth)acrylate, hydroxybutyl (meth)acrylate, hydroxycyclohexyl (meth)acrylate, 4-hydroxybutyl vinyl ether, or a half ester thereof with a cyclic anhydride, such as succinic anhydride) is copolymerized by emulsion polymerization with a (meth)acrylic ester (such as methyl (meth)acrylate, ethyl (meth)acrylate, butyl (meth)acrylate, 2-ethylhexyl (meth)acryalte, dodecyl (meth)acrylate or cyclohexyl (meth)acrylate), an aromatic monomer (such as styrene, α-methylstyrene or vinyltoluene), a vinyl ester (such as vinyl acetate, vinyl propionate or vinyl versatate), a vinyl ether (such as ethyl vinyl ether, butyl vinyl ether or cyclohexyl vinyl ether), vinyl cyanide (such as (meth)acrylonitrile), a vinyl halide (such as vinyl chloride, vinylidene chloride, vinylidene fluoride, tetrafluoroethylene, chlorotrifluoroethylene or hexafluoropropylene) or butadiene.

Further, in the present invention, various polymers sold as materials for aqueous coating materials can be used as the water-dispersible organic polymer.

In the present invention, it is preferred to use a water-soluble or water-dispersible organic polymer having a weight average molecular weight of more than 100,000. When the weight average molecular weight of the organic polymer is 100,000 or less, it is possible that the weight ratio of the organic domain to the inorganic domain does not reach 1.0, so that the water absorptivity of the hybrid material becomes low and the transparency of the hybrid material (exhibited when the hybrid material has absorbed or has been mixed with water) becomes low (as described below, it is preferred that the hybrid material of the present invention is substantially transparent under specific conditions). The weight average molecular weight of the organic polymer is more preferably 200,000 or more, still more preferably 300,000 or more, most preferably 1,000,000 or more. In the present invention, the weight average molecular weight of the organic polymer can be determined by gel permeation chromatography (GPC). In the case of the water-soluble organic polymer, the weight average molecular weight thereof is determined by GPC using a modified calibration curve therefor, which is obtained by modifying a calibration curve obtained with respect to standard monodisperse polyethylene glycol samples. In the case of the water-dispersible organic polymer, the weight average molecular weight thereof is determined using a modified calibration curve therefor, which is obtained by modifying a calibration curve obtained with respect to standard monodisperse polyethylene glycol or polystyrene samples, which are chosen depending on the conditions employed for dissolving the organic polymer in a solvent for GPC. Further, when the weight average molecular weight of the organic polymer is 10,000,000 or more, it is sometimes difficult to measure the weight average molecular weight of the organic polymer by the above-mentioned method; however, it is of course possible to use such a high molecular weight polymer. Further, in the present invention, the water-soluble organic polymer and the water-dispersible organic polymer may be used in combination. In this case, there is no particular limitation with respect to the mixing ratio of the water-soluble organic polymer to the water-dispersible organic polymer, and the mixing ratio can be appropriately selected depending on the intended use of the hybrid material of the present invention.

Figure 2:
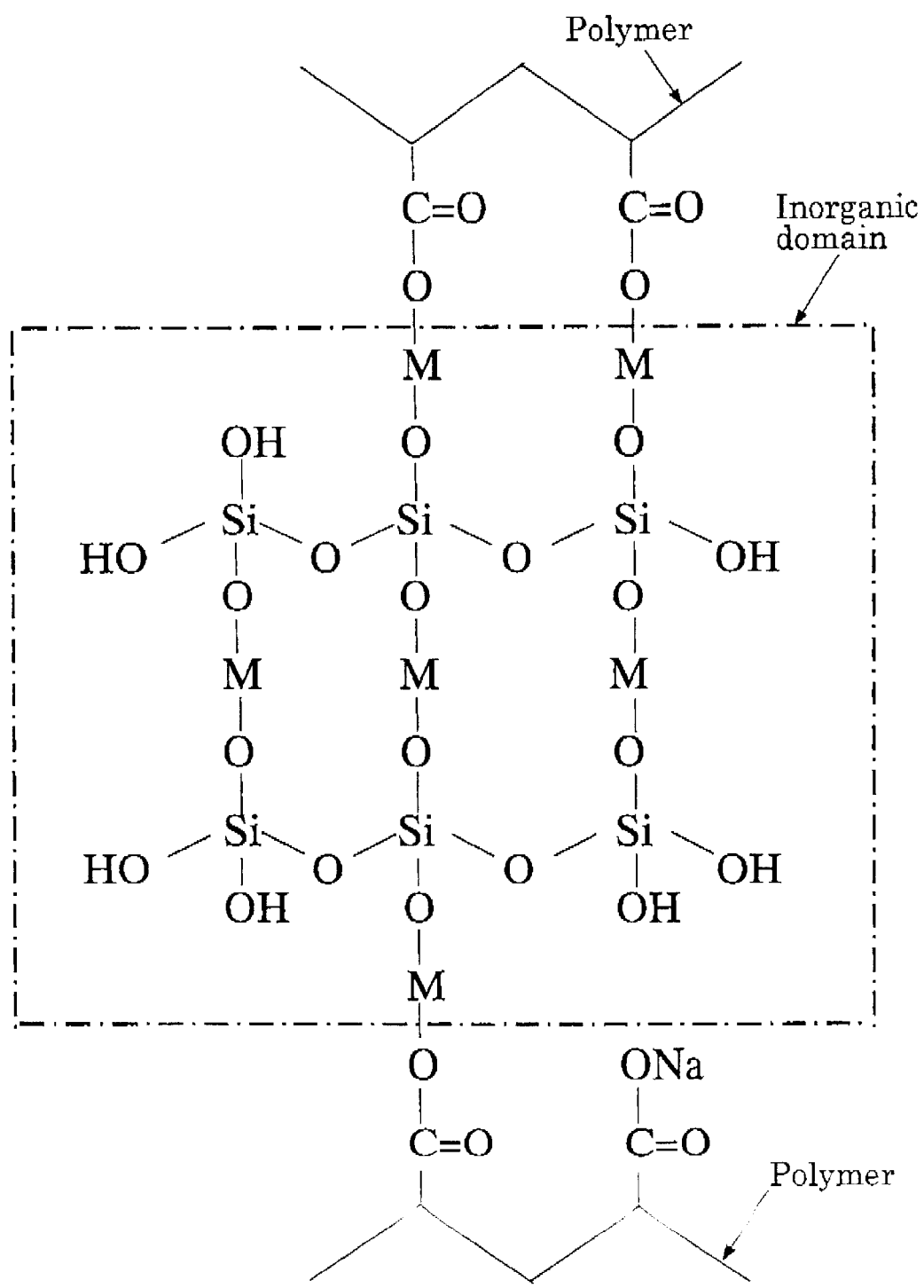
FIG. 2 is an explanatory diagram showing the structure of another embodiment of the organic domain/inorganic domain hybrid material of the present invention.
Figure 3:
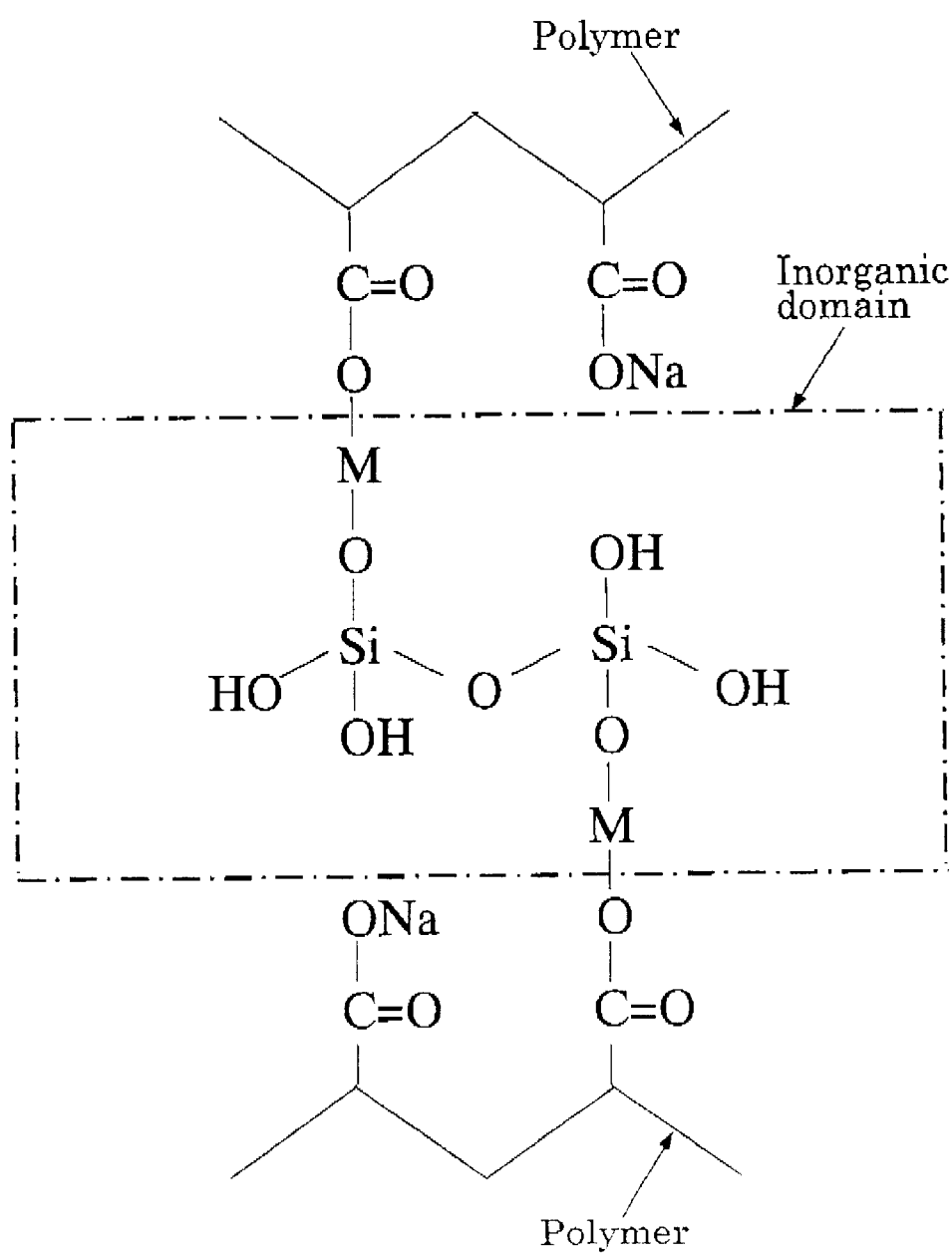
FIG. 3 is an explanatory diagram showing the structure of still another embodiment of the organic domain/inorganic domain hybrid material of the present invention.

The inorganic domain of the hybrid material of the present invention comprises a plurality of inorganic bridges, each of which independently comprises at least one silicon (Si) atom, at least two oxygen (O) atoms and at least two divalent metal atoms, wherein the silicon atom(s) and the oxygen atoms together form at least one —O—Si—O— linkage which is arranged longitudinally of the inorganic bridge, wherein each terminal of the inorganic bridge comprises the divalent metal atom, wherein the divalent metal atom is ionically bonded to the —O—Si—O— linkage of the inorganic bridge on one side and to the functional group of the organic polymer on the other side, so that the ionically crosslinked structure is formed (see FIGS. 1 to 3, in which such a crosslinked structure is illustratively shown).

The above-mentioned —O—Si—O— linkage (namely, a pair of siloxane linkages in which the pair of siloxane linkages comprises one silicon atom common thereto) is present in the inorganic bridge in a form represented by the following formula;

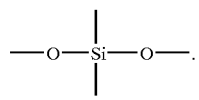

When the inorganic bridge comprises at least two —O—Si—O— linkages, the two —O—Si—O— linkages optionally have a divalent metal atom which is positioned therebetween and which is ionically bonded to oxygen atoms of the —O—Si—O— linkages positioned adjacently to the divalent metal atom, respectively.

Further, laterally, mutually adjacent inorganic bridges of the plurality of inorganic bridges are optionally linked to each other at their respective silicon atoms through at least an oxygen atom.

In the hybrid material of the present invention, there is no particular limitation with respect to the atomic ratio of the divalent metal atoms (M) to the silicon atoms (Si) forming the —O—Si—O— linkages. However, the atomic ratio M/Si is preferably in the range of from 0.1 to 5.0, more preferably from 0.3 to 3.0. The atomic ratio M/Si can be determined, for example, by a method in which the values obtained by subjecting the hybrid material to X-ray fluorescence spectrometry are converted using a calibration curve separately prepared.

The divalent metal atom used in the present invention is a metal atom which stably maintains the state of a divalent ion in water. Examples of divalent metal atoms include not only alkaline earth metals belonging to Group IIa of the Periodic Table, such as beryllium, magnesium, calcium, strontium and barium, but also copper, zinc, nickel, iron, manganese, chromium and cobalt. These divalent metals may be used individually or in combination.

Especially, the alkaline earth metals are preferred not only in that the toxicity of the alkaline earth metals is advantageously low, so that, when alkaline earth metals are used as the divalent metal atoms, the use of the hybrid material of the present invention is expanded, but also in that the hybrid material can be efficiently produced using alkaline earth metals under relatively wide range of conditions.

The divalent metal atoms can be incorporated into the hybrid material by using, as sources for the divalent metal atoms, compounds thereof, such as nitrates, sulfates, acetates, chlorides, hydroxides, oxides and carbonates. Among these compounds, it is preferred to use those which exhibit a solubility of 1% by weight or more in a solvent used in the below-described production of the hybrid material, since the divalent metal atoms in the form of ions can be easily introduced into the hybrid material. It is more preferred to use the compounds exhibiting a solubility of 5% by weight or more in the solvent.

On the other hand, in the hybrid material of the present invention, each silicon atom of the inorganic bridges is present in the form of the —O—Si—O— linkage. With respect to the sources for the silicon atoms in the —O—Si—O— linkages, there is no particular limitation. Examples of sources for the silicon atoms include inorganic silicon compounds, such as silicates (e.g., sodium orthosilicate and sodium metasilicate), silicic acid and silica; organic silicon compounds, such as silicon alkoxides, e.g., tetraethoxysilane, tetramethoxysilane and various silane coupling agents; and silicon halides, such as silicon tetrachloride. Of these, from the viewpoint of ease in handling and transparency of the hybrid material exhibited when the material has absorbed water or has been mixed with water, it is preferred to use alkali metal silicates, such as sodium orthosilicate and sodium metasilicate, silicic acid, a colloidal silica having a diameter of 100 nm or less, preferably 50 nm or less, silicate compounds, such as silicon alkoxides, e.g., tetraethoxysilane, tetramethoxysilane and various silane coupling agents, and silicon halides, such as silicon tetrachloride. The above-mentioned alkali metal silicates include water glass Nos. 1, 2 and 3 defined in Japanese Industrial Standards (JIS K 1408-66).

The hybrid material of the present invention, which has been produced using a solvent by the below-described process, may be used after removal of the solvent and unreacted raw materials by the below-described operations of washing and drying from the hybrid material. Alternatively, the hybrid material of the present invention may be used in the form of a mixture thereof with the solvent used in the production thereof and the unreacted raw materials, or a mixture obtained by impregnating with a solvent, i.e., water the hybrid material from which the solvent used in the production thereof and the unreacted raw materials have been removed.

Due to the above-mentioned ionically crosslinked structure, the hybrid material of the present invention does not exhibit solubility in the solvent (e.g., water) used in the production thereof. Therefore, the hybrid material absorbs the solvent to become a gel having substantially no fluidity (that is, the hybrid material has water absorptivity); however, it has a pH-response property and, hence, becomes liquid under acidic pH conditions.

With respect to the structure of the hybrid material of the present invention, there is no particular limitation so long as the hybrid material has a basic structure as defined in item 1 above. As a specific example of the hybrid material of the present invention, there can be mentioned a hybrid material having a structure (hereinafter, referred to as "ionically crosslinking bridge") represented by the following formula (1);

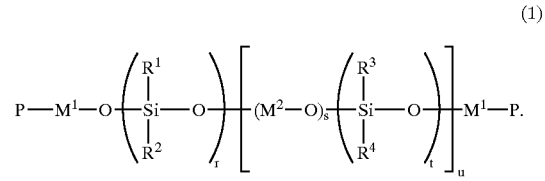

In the ionically crosslinking structure represented by formula (1) above, the portion between the left-hand $M^1$ and the right-hand $M^1$ corresponds to the above-mentioned "inorganic bridge".

In formula (1) above: P represents the organic polymer having a monovalent group derived from the functional group of the organic polymer: each of $M^1$ and $M^2$ independently represents the divalent metal atom; each of r, s and t independently represents an integer of 1 or more; and u represents an integer of 0 or more. The two $M^1$'s may be the same or different. When r is 2 or more, $R^1$'s may be the same or different, and $R^2$'s may be the same or different. When s is 2 or more, $M^2$'s may be the same or different. When t is 2 or more, $R^3$'s may be the same or different, and $R^4$'s may be the same or different. When u is 2 or more, s's may be the same or different, and t's may be the same or different.

With respect to the specific examples of $R^1$, $R^2$, $R^3$ and $R^4$, each of $R^1$, $R^2$, $R^3$ and $R^4$ may be independently any one of the following atom and groups:
—H, —OSIH(OH)OSIH(OH)$_2$,
—OH, —OSIH$_2$OSIH(OH)$_2$,
—CH$_3$, —OSI(OH)$_2$OSI(CH$_3$)(OH)$_2$,
—CH$_2$CH$_3$, —OSi(CH$_3$)(OH)OSi(CH$_3$)(OH)$_2$,
—CH$_2$CH$_2$CH$_3$, —OSi(CH$_3$)$_2$OSI(CH$_3$)(OH)$_2$,
—CH(CH$_3$)$_2$, —OSI(OH)$_2$OSIH$_2$(OH),
—CH$_2$CH$_2$CH$_2$CH$_3$, —OSIH(OH)OSiH$_2$(OH),
—CH$_2$CH(CH$_3$)$_2$, —OSiH$_2$OSIH$_2$(OH),
—CH(CH$_3$)CH$_2$CH$_3$, —OSi(OH)$_2$OSI(CH$_3$)$_2$(OH),
—C(CH$_3$)$_3$, —OSi(CH$_3$)(OH)OSi(CH$_3$)$_2$(OH),
—OSI(OH)$_3$, —OSI(CH$_3$)$_2$OSI(CH$_3$)$_2$(OH), —OSiH(OH)$_2$, —OSi(OH)$_2$OSiH$_3$,
—OSiH$_2$(OH), —OSiH(OH)OSIH$_3$,
—OSI(CH$_3$)(OH)$_2$, —OSIH$_2$OSIH$_3$,
—OSI(CH$_3$)$_2$(OH), —OSI(OH)$_2$OSI(CH$_3$)$_3$,
—OSi(OH)$_2$OSi(OH)$_3$, —OSi(CH$_3$)(OH)OSi(CH$_3$)$_3$,
—OCaOSi(OH)$_3$, —OSI(CH$_3$)$_2$OSi(CH$_3$)$_3$,
—OMgOSi(OH)$_3$, —OSi(CH$_3$)(OH)OSi(OH)$_3$,
—OCuOSi(OH)$_3$, —OSI(OH)$_2$OCaOSi(OH)$_3$,
—OSiH(OH)OSi(OH)$_3$, —OSI(OH)$_2$OMgOSi(OH)$_3$,
—OSiH$_2$OSi(OH)$_3$, —OSi(OH)$_2$OCuOSi(OH)$_3$,
—OSi(CH$_3$)(OH)OSi(OH)$_3$,
—OSI(CH$_3$)$_2$OSI(OH)$_3$ and
—OSi(OH)$_2$OSIH(OH)$_2$.

With respect to the above examples, the hydrogen atom of each of the hydroxyl group per se and the hydroxyl groups of the hydroxyl group-containing groups may independently be replaced by an alkali metal atom or a quaternary ammonium group. Further, with respect to the group having a plurality of hydroxyl groups, the hydrogen atom of each of the hydroxyl groups may independently be replaced by an alkali metal atom or a quaternary ammonium group.

Further, each of R$^1$, R$^2$, R$^3$ and R$^4$ may be independently a substituent bonded to the silicon atom in any of the above-mentioned silane coupling agents.

As a representative example of the ionically crosslinking bridge represented by formula (1) above, there can be mentioned a structure in which the ratio of s to t is 1:1, a structure in which r=1 and u=0, and a structure in which each of r, s, t and u is 1.

In the present invention, the inorganic bridges of laterally, mutually adjacent ionically crosslinking bridges of formula (1) above may be linked to each other at their respective silicon atoms through at least an oxygen atom. In such a case, specifically, the laterally, mutually adjacent ionically crosslinking bridges of formula (1) above may be linked to each other in a manner wherein R$^1$, R$^2$, R$^3$ or R$^4$ of one of the mutually adjacent ionically crosslinking bridges of formula (1) above is a single bond which is linked to one of the terminal oxygen atom of a divalent group represented by the following formula (2):

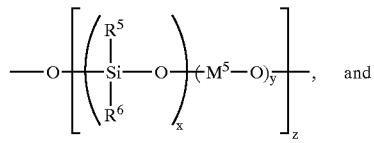

and

R$^1$, R$^2$, R$^3$ or R$^4$ of the other of the mutually adjacent ionically crosslinking bridges of formula (1) above is a single bond which is linked to the other terminal oxygen atom of the divalent group of formula (2) above, so that the laterally, mutually adjacent ionically crosslinking bridges of formula (1) above are linked (crosslinked) to each other at their respective silicon atoms through the divalent group represented by formula (2) above.

In formula (2) above, M$^3$ represents a divalent metal atom, and each of x, y and z independently represents an integer of 0 or more. When x is 2 or more, R$^5$'s may be the same or different, and R$^6$'s may be the same or different. When y is 2 or more, M$^3$'s may be the same or different. When z is 2 or more, x's may be the same or different, and y's may be the same or different.

Each of R$^5$ and R$^6$ may be independently any one of the atom and groups as mentioned above as examples of R$^1$, R$^2$, R$^3$ and R$^4$.

Specific examples of divalent groups represented by formula (2) above include;

—O—, —OSI(OH)$_2$OSiH$_2$O—,
—OSI(OH)$_2$O—, —OSiH$_2$OSiH$_2$O—,
—OCaO—, —OSI(OH)$_2$OSI(CH$_3$)$_2$O—,
—OMgO—, —OSI(CH$_3$)(OH)OSI(CH$_3$)$_2$O—,
—OCuO—, —OSI(CH$_3$)$_2$OSI(CH$_3$)$_2$)O—,
—OSIH(OH)O—, —OSi(OH)$_2$OSIH$_2$O—,
—OSiH$_2$O—, —OSiH(OH)OSiH$_2$O—,
—OSi(CH$_3$)(OH)O—, —OSiH$_2$OSIH$_2$O—,
—OSi(CH$_3$)$_2$O—, —OSI(OH)$_2$OSI(CH$_3$)$_2$O—,
—OSI(OH)$_2$OSI(OH)$_2$O—,
—OSI(CH$_3$)(OH)OSi(CH$_3$)$_2$O—,
—OCaOSi(OH)$_2$O—, —OSI(CH$_3$)$_2$OSi(CH$_3$)$_2$O—,
—OMgOSI(OH)$_2$O—, —OSI(CH$_3$)(OH)OSI(OH)$_2$O—,
—OCuOSI(OH)$_2$O—, —OSI(OH)2OCaOSi(OH)$_2$O—,
—OSiH(OH)OSI(OH)$_2$O—,
—OSi(OH)$_2$OMgOSI(OH)$_2$O—,
—OSIH$_2$OSI(OH)$_2$O—, —OSI(OH)$_2$OCuOSI(OH)$_2$O—,
—OSI(CH$_3$)(OH)OSi(OH)$_2$O—,
—OCaOSI(OH)$_2$OCaO—,
—OSI(CH$_3$)$_2$OSi(OH)$_2$O—, —OMgOSi(OH)$_2$OMgO—,
—OSI(OH)$_2$OSIH(OH)O—, —OCuOSI(OH)$_2$OCuO—,
—OSIH(OH)OSIH(OH)O—,
—OSIH$_2$OSIH(OH)O—,
—OSi(OH)$_2$OSi(CH$_3$)(OH)O—,
—OSI(CH$_3$)(OH)OSi(CH$_3$)(OH)O— and
—OSI(CH$_3$)$_2$OSI(CH$_3$)(OH)O—.

With respect to the above examples, the hydrogen atom of each of the hydroxyl group per se and the hydroxyl groups of hydroxyl group-containing groups may be independently replaced by an alkali metal atom or a quaternary ammonium group. Further, with respect to the group having a plurality of hydroxyl groups, the hydrogen atom of each of the hydroxyl groups may be independently replaced by an alkali metal atom or a quaternary ammonium group.

As representative examples of the structure of the divalent group represented by formula (2) above, there can be mentioned a structure in which z=0, and a structure in which x=0 and y=z=1.

Further, two of R$^1$, R$^2$, R$^3$ and R$^4$ of the ionically crosslinking bridge of formula (1) above may be single bonds which are, respectively, linked to the terminal oxygen atoms of the divalent group of formula (2) above, to thereby form a ring. When at least one of r and t in formula (1) above is 2 or more, two R$^1$'s, two R$^2$'s, two R$^3$'s or two R$^4$'s of the ionically crosslinking bridge of formula (1) above may be single bonds which are, respectively, linked to the terminal oxygen atoms of the divalent group of formula (2) above, to thereby form a ring.

With respect to r, s, t and u in formula (1) above, it is required that the value v$^1$ defined by the following formula:

$$v^1 = r + u \times (s+t)$$

be 1 or more. There is no particular limitation with respect to the upper limit of the value v$^1$. However, when the value v$^1$ is too large, it is possible that the hybrid material having an organic domain/inorganic domain weight ratio of at least 1 cannot be obtained. Therefore, the value v$^1$ is preferably 7,000 or less, more preferably 5,000 or less, most preferably 2,000 or less. Further, as described below in detail, it is preferred that the inorganic domain is homogenously dispersed in the form of micro or nano-size particles in the organic domain. For this purpose, the value v$^1$ is preferably 700 or less, more preferably 350 or less, most preferably 100 or less.

With respect to x, y and z in formula (2) above, it is required that the value v$^2$ defined by the following formula:

$$v^2 = z \times (x+y)$$

be an integer of 0 or more. The preferred upper limit of the value $v^2$ is the same as that of the value $v^1$ for the same reason as mentioned above in connection with the value $v^1$.

The hybrid material of the present invention may have various ionically crosslinking bridges having different structures so long as the requirements of the present invention are satisfied. Specific examples of ionically crosslinking bridges include the structures shown in FIGS. 1 to 3.

Further, the inorganic domain of the hybrid material of the present invention may have a layered structure. With respect to the layered structure of the inorganic domain of the hybrid material, an explanation is made below. It is known that compounds, such as calcium silicate hydrate and calcium aluminate silicate hydrate, form a layered structure in which calcium (Ca) atoms and oxygen (O) atoms are arranged in at least one plane to form at least one CaO layer. The inorganic domain of the hybrid material of the present invention can have a layered structure corresponding to that of calcium silicate hydrate. Further, as described below, the silicon atom of the inorganic domain may be replaced by an aluminum atom. Therefore, the inorganic domain can also have a layered structure corresponding to that of calcium aluminate silicate hydrate. In such cases, it is possible that the inorganic domain of the hybrid material of the present invention has a single-layer or multi-layer structure in which the divalent metal atoms and the oxygen atoms are arranged in one or more planes. Further, even when metals other than calcium are used as the divalent metal atoms, it is possible that the inorganic domain has a single-layer or multi-layer structure.

The presence of the above-mentioned layered structure can be confirmed by using an X-ray diffractometer.

Further, the linkage between the divalent metal atom of the inorganic bridge and the functional group of the organic polymer can be confirmed by organic analyses, such as infrared spectroscopy or various elemental analyses. For example, when an organic polymer used as a raw material has a carboxyl group, a peak in the infrared absorbance observed around 1,700 cm$^{-1}$, which is ascribed to a carboxylic acid, shifts to around 1,560 cm$^{-1}$ due to the formation of a salt caused by the formation of the linkage between the carboxyl group and the inorganic domain. However, such a shift of the peak in the infrared absorbance is also observed in the case of formation of an alkali metal salt, so that, when the raw materials contain an alkali metal salt, the linkage between the divalent metal atom of the inorganic bridge and the functional group of the organic polymer cannot be confirmed only by the shift of the peak in the infrared absorbance. In the case where the raw materials contain an alkali metal, the linkage between the divalent metal atom and the functional group of the organic polymer can be confirmed by the following method. The hybrid material is satisfactorily washed under conditions wherein the alkali metal present in the hybrid material can be removed, followed by elemental analysis to confirm that the amount of the alkali metal salt is satisfactorily small, relative to the amount of the functional groups of the water-soluble organic polymer. Then, the infrared absorbance of the hybrid material is measured. If a peak is observed around 1,560 cm$^{-1}$ in the measurement, this confirms the formation of linkage between the divalent metal atom of the inorganic bridge and the functional group of the organic polymer.

In the present invention, for the formation of the above-mentioned linkage between the inorganic bridge and the functional group of the organic polymer, it is necessary that the silicon atom be bonded to at least two oxygen atoms. Generally, a silicon atom is tetravalent. In the present invention, it is most preferred that the silicon atom is bonded to four oxygen atoms; however, a substance (such as a nitrogen atom or a carbon atom) other than an oxygen atom may be bonded to the silicon atom at binding sites thereof to which the oxygen atoms bonded to the divalent metal atoms are not bonded. However, in order for the hybrid material to exhibit excellent pH-response property, it is necessary that the hybrid material be capable of getting dissolved in an acidic aqueous solution, and, hence, it is preferred that the above-mentioned substance other than an oxygen atom exhibits water-solubility when the binding between the above-mentioned divalent metal atom and the —O—Si—O— linkage is broken (i.e., when the hybrid material is mixed with an acidic aqueous solution, so that the ionically crosslinked structure is broken). Specifically, when the binding between the above-mentioned divalent metal atom and the oxygen atom bonded to the silicon atom is broken, the resultant decomposed product has, for example, a structure in which two substituents, such as $R^1$ and $R^2$ shown in formula (1) above, are bonded to the silicon atom and the terminal of the inorganic bridge (separated from the organic polymer) is in the form of a silanole group or a siloxane ion. In the present invention, it is preferred that the above-mentioned substance (other than an oxygen atom) bonded to the silicon atom exhibits solubility in an acidic aqueous solution in the decomposed product having the above-mentioned structure.

When the above-mentioned substituent, such as the above-mentioned $R^1$ or $R^2$, has a large number of hydroxyl groups, the substituent exhibits a relatively high solubility in an acidic aqueous solution even when the substituent has a high molecular weight and, hence, various types of substituents can be appropriately chosen. On the other hand, when a substituent (such as an alkyl group) which has poor solubility in an acidic aqueous solution is bonded to the silicon atom, the molecular weight of the substituent is preferably 300 or less, more preferably 100 or less. In the present invention, with respect to the definition of the "solubility in an acidic aqueous solution" exhibited when the binding between the divalent metal atom and the oxygen atom bonded to the silicon atom is dissociated, the hybrid material is defined as having such a solubility when the solubility of the hybrid material in an acidic aqueous solution (having a pH of 1) of hydrochloric acid is 1% by weight or more.

In the present invention, it is preferred that the hybrid material is substantially transparent when the hybrid material has water mixed therewith in an amount which is 9 times as large as the dry weight of the hybrid material. Specifically, it is preferred that, when the hybrid material having water mixed therewith in an amount which is 9 times as large as the dry weight of the hybrid material is placed in a quartz cell having an optical path length of 2 mm, and the transmitted light ratios of the hybrid material to water are measured by means of a spectrophotometer at wavelengths of 450 nm, 550 nm and 660 nm, the average value of the transmitted light ratios measured at the above-mentioned three wavelengths is 10% or more, more advantageously 30% or more, most advantageously 50% or more. In the present invention, the organic domain/inorganic domain weight ratio is 1.0 or more. Further, in many cases, the specific weight of the inorganic domain is larger than that of the organic domain. Therefore, in many cases, the hybrid material of the present invention has a structure in which the inorganic domain is dispersed in the organic domain. In such a case, when the size of the inorganic domain is 100 nm or less, preferably 50 nm or less, the hybrid material of the present invention exhibits the above-mentioned feature that the hybrid material is transparent when the hybrid material has water mixed therewith in an amount which is 9 times as large as the dry weight of the hybrid material. When the inorganic domain is micro-dispersed in the organic domain, the hybrid material of the present invention exhibits a rapid response to the pH change (i.e., excellent pH-response property).

On the other hand, when the size of the inorganic domain of the hybrid material is too large, so that the transparency of the hybrid material having absorbed water is markedly lowered, it is likely that the organic domain/inorganic domain weight ratio of the hybrid material becomes too small and outside the range defined in the present invention. As a result, the hybrid material exhibits poor water absorptivity. On the other hand, when the above-defined transparency of the hybrid material of the present invention is high, it becomes possible to apply the hybrid material in the field related to optical products, e.g., a contact lens which are required to have a high transparency.

With respect to the size of the inorganic domain, when the inorganic domain is spherical, the diameter of the inorganic domain is defined as the size thereof. On the other hand, when the inorganic domain is not spherical, the length of the long axis in the three dimensional structure of the inorganic domain is defined as the size of the inorganic domain. For example, when the inorganic domain has a shape of a rectangular parallelepiped, the length of the longest side thereof is defined as the size of the inorganic domain, whereas, when the inorganic domain has a spheroidal shape, the length of the major axis thereof is defined as the size of the inorganic domain.

In the present invention, the size of the inorganic domain is generally measured by a method comprising subjecting the hybrid material to electron microscopy, such as scanning electron microscopy or transmission electron microscopy, to measure the sizes of inorganic domains which appear on a screen used in the electron microscopy, and calculating the average of the obtained values as the size of the inorganic domain. Further, in the electron microscopy, even when the electron microscopy is performed by using an electron microscope having a high resolution, it is possible that the amount of inorganic domains observed through the electron microscope is smaller than the calculated amount of inorganic domains which should be present in the observed portion of the hybrid material, wherein calculation of the amount is conducted, based on the organic domain/inorganic domain weight ratio obtained by a method described below. In such a case, it can be judged that the hybrid material contains inorganic domains which are too small to be observed through the electron microscope (that is, the sizes of the inorganic domains are beyond the resolution of the electron microscope).

In the hybrid material of the present invention, each silicon atom of the inorganic bridges is present in the form of the —O—Si—O— linkage and, at least at each terminal of the inorganic bridge, the silicon (Si) atom of the —O—Si—O— linkage is bonded to the divalent metal (M) atom through the oxygen (O) atom to form a —O—Si—O—M— linkage. In the infrared spectroscopy, a peak in the absorbance ascribed to the —Si—O—M— linkage (formed by the silicon (Si) atom, the oxygen (O) atom and the divalent metal (M) atom) is observed at a wave number which is smaller than the wave number at which a peak in the absorbance ascribed to the —Si—O—Si— linkage is observed. With respect to such a shift of the peak in the absorbance, an explanation is made below. In the infrared spectroscopy of a structure (e.g., silica gel) which contains a plurality of siloxane linkages (i.e., —O—Si linkages), wherein almost all of the siloxane linkages are bonded to further silicon atoms to form —Si—O—Si— linkages, a peak in the absorbance ascribed to the siloxane linkages is observed around 1.090 cm$^{-1}$. On the other hand, when, as in the case of the hybrid material of the present invention, such a structure further contains a —Si—O—M— linkage, a peak in the absorbance ascribed to the siloxane linkages shifts to a lower wave number side. For example, when a structure as shown in FIG. 1 contains calcium atoms as the divalent metal atom M's, a peak in the absorbance ascribed to the —O—Si—O—linkage (i.e., a pair of siloxane linkages) shifts to 970 cm$^{-1}$. Needless to say, the degree of the shift of the peak in the absorbance ascribed to the —O—Si—O— linkage in the infrared spectroscopy depends on the type and amount of the divalent metal (M) atom forming the —Si—O—M— linkage. However, so long as the divalent metal (M) atom forms the —Si—O—M— linkage, the peak in the absorbance ascribed to the —Si—O— linkage shifts to a wave number smaller than about 1,090 cm$^{31\ 1}$, irrespective of the type and amount of the divalent metal (M) atom. In the present invention, by virtue of the presence of the —Si—O—M— linkage, the hybrid material exhibits excellent pH-response property, that is, not only the linkage between the water-soluble or water-dispersible organic polymer and the divalent metal atom but also the linkage between the divalent metal atom and the oxygen atom of the —O—Si—O— linkage undergo dissolution and regeneration in a reversible manner depending on the pH. Therefore, when the hybrid material of the present invention is used as a water absorptive material and the like, not only can the hybrid material after use be easily decomposed into its components, but also the regeneration of the hybrid material from the components can be easily effected, so that the hybrid material is advantageous from the viewpoint of prevention of environmental destruction and efficient utilization of resources.

The hybrid material of the present invention may further contain elements other than mentioned above, e.g., metal atoms, such as alkali metal atoms (sodium, potassium, etc.), an aluminum atom and an iron atom. Of these, an aluminum atom is especially preferred, because, when aluminum atoms is used in the inorganic domain of the hybrid material, it is possible that the aluminum atoms replace the silicon atoms to strengthen the linkage between the inorganic domain and the water-soluble or water-dispersible organic polymer. With respect to the amount of the silicon atoms replaced by the aluminum atoms, there is no particular limitation. However, it is preferred that 1 to 15% of the silicon atoms are replaced by the aluminum atoms. The replacement of the silicon atoms by the aluminum atoms can be confirmed by chemical shift of the silicon atom in spectrum obtain by $^{29}$S1 nuclear magnetic resonance spectroscopy (NMR method). Examples of sources for the aluminum atoms include inorganic aluminum compounds, such as aluminum chloride and sodium aluminate, and aluminum alkoxides represented by triethoxyaluminum.

When it is intended to use the hybrid material of the present invention after removing the solvent (used in the production of the hybrid material) and the unreacted raw materials from the hybrid material by washing and drying, the operations of washing and drying can be conducted as follows.

The washing operation is generally conducted using the same solvent as used in the production of the hybrid material in an amount which is at least 100 times the total weight of the raw materials (in terms of solids) for the hybrid material until the difference in dry weight between the hybrid material before washing and the hybrid material after washing becomes 10% or less. On the other hand, the drying operation is generally conducted by subjecting the thus washed hybrid material to drying at 60° C. under a reduced pressure of 10 mmHg or less until the weight of the hybrid material becomes constant (i.e., the change in weight of the hybrid material becomes 0.5% or less per hour).

When the hybrid material of the present invention is used as a water-absorbing material, it is preferred that the water absorptivity of the hybrid material is as high as possible. Specifically, the water absorptivity of the hybrid material is preferably 10 or more, more preferably 15 or more, still more preferably 20 or more, in terms of the weight ratio of the hybrid material having absorbed water to the dried hybrid material. The water absorptivity is measured with respect to the hybrid material whose weight has become constant in the above-mentioned drying operation. Generally, the water absorptivity is measured by a method in which a sample of the hybrid material which has been subjected to the above-mentioned drying operation is placed in a tea bag-shaped nylon filter (about 100 to 400 mesh), followed by causing the hybrid material to absorb water, and, then, the water absorptivity is calculated, based on the increase in weight of the hybrid material. Alternatively, the water absorptivity can be conveniently obtained as a ratio of the weight of the hybrid material which is measured after the above-mentioned washing operation and before the above-mentioned drying operation to the weight of the hybrid material whose weight has become constant in the above-mentioned drying operation.

In the hybrid material of the present invention, it is necessary that the organic domain/inorganic domain weight ratio is 1.0 or more, and the weight ratio is preferably 1.3 or more, more preferably 1.6 or more, still more preferably 2.0 or more. When the organic domain/inorganic domain weight ratio is less than 1.0, the hybrid material exhibits excellent pH-response property, but the water absorptivity of the hybrid material is disadvantageously lowered. When the organic domain/inorganic domain weight ratio is 1.0 or more and less than 1.3, it is possible that the water absorptivity of the hybrid material is lowered depending on the type of the divalent metal atom used. When the organic domain/inorganic domain weight ratio is more than 1.3 and less than 1.6, it is possible that the transparency of the hybrid material (which is exhibited when it has been mixed with water) and the water absorptivity of the hybrid material are lowered depending the conditions (such as pH) used in the production of the hybrid material. In the case where the organic domain/inorganic weight ratio is 2.0 or more, even if the conditions for producing the hybrid material is not strictly controlled, a hybrid material which, when mixed with water, exhibits a high transparency, can be easily obtained.

With respect to the organic domain/inorganic domain weight ratio, there is no particular upper limit. However, from the viewpoint of ease in the production of the hybrid material, the organic domain/inorganic domain weight ratio is preferably 99 or less, more preferably 50 or less, still more preferably 20 or less, most preferably 5 or less.

The organic domain/inorganic domain weight ratio can be measured by the following method with respect to the hybrid material which has been subjected to the above-mentioned washing operation and the above-mentioned drying operation, wherein the drying operation is conducted at 60° C. under a reduced pressure of 10 mmHg or less until the weight of the hybrid material becomes constant as defined above.

First, the determination of each of the metal atoms and the silicon atoms can be conducted by X-ray fluorometry using a calibration curve prepared in advance. In the determination by X-ray fluorometry, the weights of the divalent metal atoms and the silicon atoms (which are components of the inorganic domain) are determined in terms of the weights of oxides thereof on the assumption that the divalent metal atoms and the silicon atoms are present in the form of oxides thereof. The total weight of the divalent metal atoms and the silicon atoms is defined as the weight of the inorganic domain. Separately, the hybrid material is heated in air by using an electric furnace to elevate the temperature of the hybrid material from room temperature to 1,000° C. at a rate of 25° C./min, followed by maintaining the temperature at 1,000° C. for 10 minutes, to thereby calcine the hybrid material. The resultant ash is analyzed by various elemental analyses. From the change in weight of the hybrid material, which is caused by the calcination, and the elemental ratio obtained by the elemental analyses, the weight of organic components derived from the organic polymer is obtained. The total weight of the organic components is defined as the weight of the organic domain. When carbon atoms are detected in the ash obtained by the calcination, the weight of the carbon atoms (in terms of methyl groups) is added to the weight of the organic domain. Further, when the alkali metal atoms, such as a lithium atom and a sodium atom, are detected in the ash, the weights of the alkali metal atoms are also added to the weight of the organic domain, because the organic polymer binds to such alkali metal atoms.

Further, when the hybrid material of the present invention contains aluminum atoms, the replacement of the silicon atoms by the aluminum atoms can be confirmed by the above-mentioned NMR method. Further, the determination of the aluminum atom can be conducted by the above-mentioned X-ray fluorometry as in the case of the determination of the silicon atom, and the determined weight of the aluminum atom (in terms of an oxide thereof) is added to the weights of the divalent metal atoms and the silicon atoms to obtain the weight of inorganic domain.

Further, in the hybrid material of the present invention, when only a single type of divalent metal atom and only a single type of organic polymer are used, the organic domain/inorganic domain weight ratio can be obtained using data obtained by analyzing a target sample of the hybrid material by infrared spectroscopy, based on data obtained in advance with respect to other samples, i.e., based on the relationship between the organic domain/inorganic domain weight ratio calculated by the above-mentioned analysis and the ratio of the intensity of the absorbance ascribed to a structure (such as a hydrophilic functional group) characteristic of the organic polymer to the intensity of the absorbance ascribed to a structure (e.g., a siloxane linkage) characteristic of the inorganic domain. Specifically, for example, when only calcium is used as the divalent metal atom and only polyacrylic acid is used as the organic polymer, there is a relationship wherein the value which is 1.1 times the ratio of the intensity of the absorbance observed around 1,560 cm$^{-1}$ (which is ascribed to the carbonyl moiety of a carboxyl group) to the intensity of the absorbance observed around 970 cm$^{-1}$ (which is ascribed to the —O—Si—O— linkage) is equal to the organic domain/inorganic domain weight ratio. In the infrared spectroscopy, in accordance with the generally employed method, the intensity of the absorbance is measured as a peak intensity obtained by drawing a base line with respect to the peak ascribed to the target structure. In the above-mentioned instance (in which the intensity of the absorbance ascribed to the carbonyl moiety of a carboxyl group and the intensity of the absorbance ascribed to the —O—Si—O— linkage are measured), a point in the absorbance around the wave number of 1,250 cm$^{-1}$, at which no peak is observed, is used as a base point from which base lines are drawn on the higher and lower wave number sides, respectively.

With respect to the form of the hybrid material of the present invention, there is no particular limitation, and the hybrid material may be used in various forms depending on the intended use thereof so long as the hybrid material does not decompose. For example, the hybrid material of the present invention may be used in the form of a mixture thereof with a solvent, such as water or an alcohol, an inorganic substance, such as a metal, a ceramic or a clay, or an organic substance, such as an organic fiber, a surfactant or a resin.

Hereinbelow, an explanation is made with respect to the process for producing the hybrid material of the present invention.

The hybrid material of the present invention can be produced by a process comprising contacting, in the presence of an aqueous medium and at a pH of 7 or more, the following chemical species (a), (b), (c) and optionally (d) with each other;

(a) silicate anions formed from a silicate compound or a silicon halide, (b) polymer anions formed from a water-soluble or water-dispersible organic polymer having a plurality of functional groups selected from the group consisting of anionic functional groups and nonionic functional groups and optionally having at least one cationic functional group, (c) divalent metal cations formed from a divalent metal salt, and optionally (d) aluminate anions formed from an aluminum compound.

With respect to the specific method for contacting each of the chemical species, there is no particular limitation so long as the formation of the Ionic bond between the —O—Si—O— linkage and the divalent metal atom occurs in the presence of the water-soluble or water-dispersible organic polymer or the formation of the ionic bond between the divalent metal atom and the functional group of the water-soluble or water-dispersible organic polymer occurs in the presence of a silicon atom forming the —O—Si—O— linkage Specific examples of the method for contacting the above-mentioned chemical species include (1) a method comprising preparing a solution or dispersion of a mixture of the water-soluble or water-dispersible organic polymer and a silicate compound or a silicon halide, and adding a divalent metal compound to the solution or dispersion, with the proviso that, when the solution or the dispersion has a pH of less than 7, the pH of the solution or dispersion is adjusted to 7 or more by addition of a basic substance before the addition of the divalent metal compound, (2) a method comprising preparing, at a pH of less than 7, a solution or dispersion of a mixture of a water-soluble or water-dispersible organic polymer, a silicate compound or a silicon halide, and a divalent metal compound, and adding a basic substance to the solution or dispersion to adjust the pH of the solution or dispersion to 7 or more, (3) a method comprising preparing, in advance, a compound of a divalent metal compound with a silicate compound or a silicon halide, mixing the prepared compound with a water-soluble or water-dispersible organic polymer under an acidic condition, and mixing the resultant mixture with an alkaline solution, (4) a method comprising preparing a solution of a mixture of a silicate compound or a silicon halide and a divalent metal compound under an acidic condition, followed by addition of an alkaline solution or dispersion of a water-soluble or water-dispersible organic polymer to obtain a mixture having a pH of 7 or more, and (5) a method comprising preparing an acidic liquid mixture of a water-soluble or water-dispersible organic polymer and a divalent metal compound, followed by addition of an alkaline solution of a silicate compound or a silicon halide to obtain a mixture having a pH of 7 or more.

It is preferred that the contacting of the above-mentioned chemical species is conducted at a pH of 9 or more. With respect to the pH at which the chemical species are contacted, there is no particular upper limit. However, from the viewpoint of obtaining a hybrid material exhibiting a high transparency when the hybrid material has absorbed water or been mixed with water it is preferred to contact the chemical species at a pH of 13 or less. When the contacting of the chemical species is conducted at a pH of more than 13, the resultant hybrid material exhibits excellent pH-response property, but, in some cases, disadvantages are caused wherein the water absorptivity of the hybrid material, and the transparency of the hybrid material which has absorbed water or been mixed with water are lowered.

When, as the silicate compound, an organic silicon compound (e.g., an silicon alkoxide) is used, such an organic silicon compound is generally subjected to hydrolysis before use. The hydrolysis of the organic silicon compound can be conducted by any conventional methods. Needless to say, the hydrolysis proceeds in the presence of water. The hydrolysis of the organic silicon compound is generally promoted in an acidic condition.

It is a characteristic of the reaction for forming the hybrid material of the present invention that the reaction generally rapidly proceeds by mixing the chemical species at room temperature. When the organic silicon compound is used as a source for the silicon atoms forming the —O—Si—O— linkages, it is preferred that the organic silicon compound is subjected to hydrolysis prior to use, or the organic silicon compound is used under an acidic condition to thereby hydrolyze the organic silicon compound.

As examples of sources for the above-mentioned chemical species (a), (c) and (d), there can be mentioned the above-mentioned sources for the silicon atoms forming the —O—Si—O— linkages, the above-mentioned sources for the divalent metal atoms and the above-mentioned sources for aluminum, respectively. Further, as sources for chemical species (b), the above-mentioned organic polymers can be used, and the water-soluble organic polymer and the water-dispersible organic polymer can be used in combination. When the water-soluble organic polymer and the water-dispersible organic polymer is used in combination, there is no particular limitation with respect to the mixing ratio of the water-soluble organic polymer to the water-dispersible organic polymer, and the mixing ratio can be appropriately selected depending on the intended use of the hybrid material.

With respect to the source for the silicon atoms forming the —O—Si—O— linkages and the source for the divalent metal atoms, the atomic ratio of the divalent metal atoms in the source therefor to the silicon atoms in the source therefor is not particularly limited; however, the atomic ratio is preferably in the range of from 0.1 to 5.0, more preferably in the range of from 0.3 to 3.0. Further, the amount of the organic polymer is not particularly limited so long as the produced hybrid material has an organic domain/inorganic domain weight ratio of 1.0 or more. In many cases, the organic polymer is used in an amount larger than the total amount of the inorganic materials, which is calculated as the sum of the amounts of the oxide of the silicon atom used and the oxide of the divalent metal atom used. It is preferred that the organic polymer/inorganic materials weight ratio is 1.3 or more, more advantageously 1.6 or more, still more advantageously 2.0 or more. With respect to the organic polymer/inorganic materials weight ratio, there is no particular upper limit. However, from the economical point of view, it is preferred that the organic polymer/inorganic materials weight ratio is 99 or less.

The solvent (i.e., the above-mentioned aqueous medium) used in the process of the present invention needs to contain water. It is preferred to use an aqueous medium containing water in an amount of 10% by weight or more at room temperature. As the aqueous medium, of coarse, water can be used. Alternatively, the aqueous medium may be a mixture of water with a solvent miscible with water, such as acetone, methanol, ethanol, dimethyl sulfoxide or a mixture thereof. In the production of the hybrid material, it is not required that the organic polymer be completely dissolved in the aqueous medium. However, for uniformly reacting the chemical species, it is preferred that the aqueous medium has a water content of 50% by weight or more and the organic polymer is completely dissolved in the aqueous medium. Examples of basic substances include alkali metal hydroxides, such as sodium hydroxide and potassium hydroxide, or aqueous solutions thereof, aqueous ammonia and amines. Examples of acidic substances used for rendering a reaction system acidic include mineral acids, such as hydrochloric acid and nitric acid, and organic acids, such as acetic acid and p-toluenesulfonic acid.

As described above, the hybrid material of the present invention exhibits not only high water absorptivity but also excellent pH-response property, so that the hybrid material can be advantageously used in disposable diapers, sanitary products and the like. Further, the hybrid material of the present invention in dry form exhibits excellent heat resistance and mechanical strength and, hence, can be used in various fields, such as a dental filler, a hydrophilic coating, an adhesive and a flame retardant material. Further, it is expected to use the hybrid material of the present invention in fields where the electrical properties of the hybrid material is utilized, i.e., fields related to a conductive gel (obtained by causing the hybrid material to absorb water or an electrolytic solution), an antistatic material and the like.

In another aspect of the present invention, there is provided a hydrophilic coating comprising the hybrid material of the present invention.

The coating comprising the hybrid material of the present invention exhibits not only excellent hydrophilicity, but also excellent pH-response property. Therefore, when it becomes necessary to remove the coating from the substrate for the purpose of, for example, re-coating the substrate, the coating can be very easily removed from the substrate. It is preferred that such a hydrophilic coating of the present invention exhibits a hydrophilicity of 60° or less, more advantageously 40° or less, still more advantageously 20° or less, in terms of the contact angle of a waterdrop against the surface of the coating.

With respect to the method for forming the hydrophilic coating of the present invention, there is no particular limitations For example, the hydrophilic coating of the present invention can be formed by any of the following methods: (i) a method comprising mixing a water-soluble organic polymer, a water-dispersible organic polymer or a mixture thereof, with the above-mentioned silicate compound or silicon halide, followed by adjusting the pH of the resultant mixture to 7 or more, applying the resultant mixture to a substrate to form a coating, optionally followed by drying, and adding to the coating a solution of the above-mentioned divalent metal compound by application, immersion, spraying or the like; (ii) a method comprising mixing a water-soluble organic polymer, a water-dispersible organic polymer or a mixture thereof, with the above-mentioned silicate compound or silicon halide and the divalent metal compound, followed by adjusting the pH of the resultant mixture (for preventing gelation of the mixture) to less than 7, preferably in the range of from 3 to less than 7, more preferably from 5 to less than 7, applying the resultant mixture to a substrate to form a coating, optionally followed by drying, and optionally adding a solution (e.g., a solution of the above-mentioned basic substance in the above-mentioned solvent) having a pH of 7 or more by immersion, spraying or the like; and (iii) a method comprising applying a water-soluble organic polymer or a mixture thereof of a water-soluble organic polymer and a water-dispersible organic polymer to a substrate, optionally followed by drying, and applying a mixture of a solution of the silicate compound or the silicon halide and the divalent metal compound (which mixture has been stabilized by adjusting the pH of the solution to less than 7. preferably in the range of from 3 to less than 7, more preferably from 5 to less than 7) to the coating by application, immersion, spraying or the like.

With respect to the raw materials for forming the hydrophilic coating of the present invention, such as a source for the silicon atoms forming the —O—Si—O— linkages, a source for the divalent metal atoms and a source for the organic polymer, the raw materials may be used, for example, in the amounts mentioned above in connection with the production of the hybrid material Further, with respect to the divalent metal compound solution (used as a raw material in the method of item (i) above) and the mixture of the solution of a silicate compound or a silicon halide with the divalent metal compound (used as a raw material in the method of item (iii) above), each of which is added to a reaction system which already contains other raw material(s), these raw materials can be used in excess amounts.

The above-mentioned hydrophilic coating of the present invention has a structure in which the above-mentioned organic and inorganic domains are dispersed throughout the coating. Alternatively, also in the case of a coating comprising a lower organic layer comprised of an organic polymer and an upper inorganic layer (formed over the lower organic layer) comprised of inorganic molecules having a structure which are the same as or similar to that of the inorganic bridges of the inorganic domain, such a coating exhibits high hydrophilicity.

Accordingly, in still another aspect of the present invention, there is provided a hydrophilic coating comprising:

a lower organic layer comprised of a water-dispersible organic polymer having a plurality of functional groups selected from the group consisting of anionic functional groups and nonionic functional groups and optionally having at least one cationic functional group, and an upper inorganic layer which is formed over the organic layer, wherein the inorganic layer comprises a plurality of inorganic molecules selected from the group consisting of inorganic ring-forming molecules and inorganic free-end molecules, each of the inorganic ring-forming molecules independently comprising at least one silicon (Si) atom, at least two oxygen (O) atoms and at least two divalent metal atoms, wherein the silicon atom(s) and the oxygen atoms together form at least one —O—Si—O— linkage which is arranged longitudinally of the inorganic ring-forming molecule, wherein each terminal of the inorganic ring-forming molecule comprises the divalent metal atom, wherein the divalent metal atom is ionically bonded to the —O—Si—O— linkage of the inorganic ring-forming molecule and to the functional group of the organic polymer, wherein, when the inorganic ring-forming molecule comprises at least two —O—Si—O— linkages, the two —O—Si—O— linkages optionally have a divalent metal atom which is positioned therebetween and which is ionically bonded to oxygen atoms of the —O—Si—O— linkages positioned adjacently to the adjacently metal atom, respectively, and each of the inorganic free-end molecules independently comprising at least one silicon (Si) atom, at least two oxygen (O) atoms and at least one divalent metal atom, wherein the silicon atom(s) and the oxygen atoms together form at least one —O—Si—O— linkage which is arranged longitudinally of the inorganic free-end molecule, wherein a non-free-end terminal of the inorganic free-end molecule comprises the divalent metal atom, wherein the divalent metal atom is ionically bonded to the —O—Si—O— linkage of the inorganic free-end molecule and to the functional group of the organic polymer, wherein, when the inorganic free-end molecule comprises at least two —O—Si—O— linkages, the two —O—Si—O— linkages optionally have a divalent metal atom which is positioned therebetween and which is ionically bonded to oxygen atoms of the —O—Si—O— linkages positioned adjacently to the divalent metal atom, respectively, and wherein laterally, mutually adjacent inorganic molecules of the plurality of inorganic molecules are optionally linked to each other at their respective silicon atoms through at least an oxygen atom.

With respect to the structure of the coating of the present invention, which comprises the lower organic layer an a the upper inorganic layer (hereinafter, the coating is frequently referred to as the "double-layer coating"), there is no particular limitation so long as the coating has structural characteristics defined in item 9 above, As a specific example of the lower organic layer/upper inorganic layer coating of the present invention, there can be mentioned a coating having at least one structure selected from the group consisting of a structure represented by formula (1) above and a structure represented by the following formula (3):

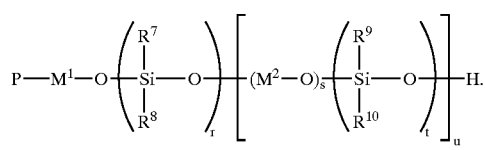

(3)

In formula (3) above, each of P, $M^1$, $M^2$, r, s, t and u is as defined for formula (1) above.

Each of $R^7$, $R^8$, $R^9$ and $R^{10}$ may, for example, independently be any one of the atom and the groups which are mentioned above as examples of $R^1$, $R^2$, $R^3$ and $R^4$ in formula (1) above.

Figure 4:
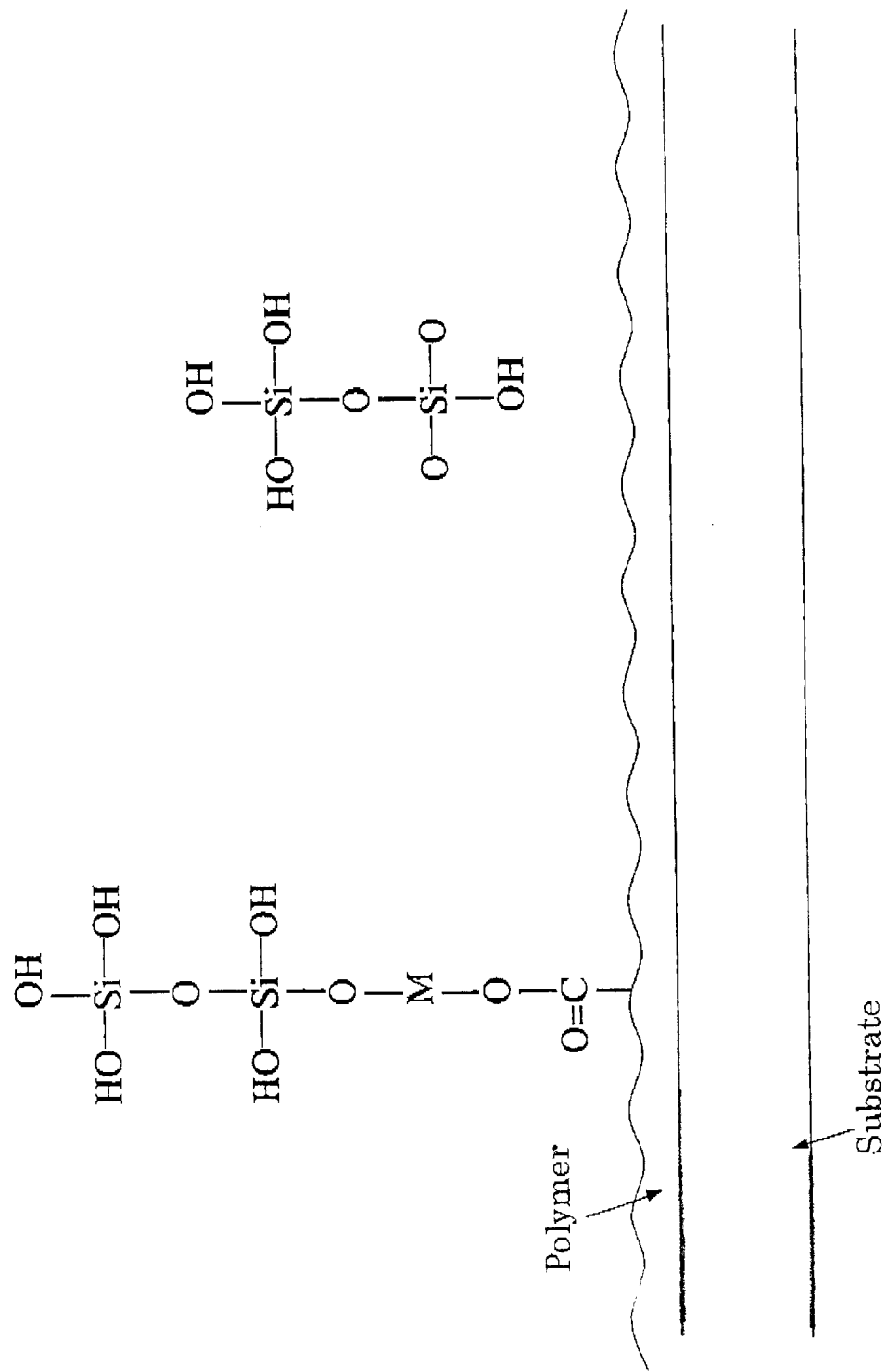
FIG. 4 is an explanatory diagram showing the structure of an embodiment of the hydrophilic coating of the present invention, which comprises a lower organic layer and an upper inorganic layer.

A specific example of the structure of the double-layer coating of the present invention is shown in FIG. 4, which illustratively shows the structure of the double-layer coating, in which each terminal of the inorganic ring-forming molecule comprises the divalent metal atom which is ionically bonded to the —O—Si—O— linkage of the inorganic ring-forming molecule on one side and to the functional group of the organic polymer on the other side, and a non-free-end terminal of the inorganic free-end molecule comprises the divalent metal atom which is ionically bonded to the —O—Si—O— linkage of the inorganic free-end molecule on one side and to the functional group of the organic polymer on the other side.

With respect to the method for producing the double-layer coating of the present invention, there is no particular limitation. For example, the double-layer coating can be produced by a method comprising applying a water-dispersible organic polymer to a substrate to form a coating, optionally followed by drying, and applying a mixture of a divalent metal compound and a solution of the silicate compound or the silicon halide (which mixture has been stabilized by adjusting the pH of the solution to less than 7, preferably in the range of from 3 to less than 7, more preferably from 5 to less than 7) to the coating by application, immersion, spraying or the like.

With respect to the source for the silicon atoms forming the —O—Si—O— linkages, the source for the divalent metal, and the source for the water-dispersible organic polymer, which are used for forming the double-layer coating, those mentioned above can be used in their respective amounts mentioned above. Further, in the above-mentioned method, the above-mentioned mixture of a divalent metal compound and a solution of the silicate compound or the silicon halide (which mixture has been stabilized by adjusting the pH of the solution to less than 7, preferably in the range of from 3 to less than 7, more preferably from 5 to less than 7), which is applied to the substrate after the application of the organic polymer, may be used in an excess amount.

The above-mentioned double-layer coating not only has high hydrophilicity, but also has the following advantages. The coating has the upper inorganic layer formed on the lower organic layer, so that, even when the hydrophilicity of the coating is lowered with the lapse of time or for other reasons, the hydrophilicity of the coating can be easily restored by forming an upper inorganic layer over the coating without a need for removing the coating as a whole. Further, the coating can be obtained by forming an upper inorganic layer on a lower organic layer composed of a conventional aqueous paint. Therefore, conventional materials can be utilized without sacrificing advantageous properties thereof, such as excellent coating strength.

The hydrophilic coating of the present invention (comprising the organic domain and the inorganic domain) and the double-layer coating of the present invention (comprising the lower organic layer and the upper inorganic layer) have the above-mentioned excellent properties, so that the coatings can be advantageously used not only in the field related to paints, such as an antifouling paint, a fog resistant paint and a waterdrop resistant paint, but also as a material for a non-image portion of a planographic printing plate.

BEST MODE FOR CARRYING OUT THE INVENTION

Hereinbelow, the present invention will be described in more detail with reference to the following Examples and Comparative Examples, which should not be construed as limiting the scope of the present invention.

In the Examples and Comparative Examples, various properties were measured and evaluated as follows.

①  Organic Domain/inorganic Domain Weight Ratio

For the determination of the organic domain/inorganic domain weight ratio of the hybrid materials produced in the Examples and Comparative Examples, a calibration curve is prepared as follows. First, several samples of the hybrid material are prepared, and each of the prepared samples is subjected to the following treatment. The sample hybrid material is washed with the same solvent as used in the production of the sample hybrid material in an amount which is at least about 100 times the total weight of the raw materials (in terms of solids) of the sample hybrid material until the difference in dry weight between the sample hybrid material before washing and the sample hybrid material after washing becomes 10% or less. Then, the sample hybrid material is subjected to drying at 60° C. under a reduced pressure of 10 mmHg or less for more than 5 hours until the weight of the hybrid material becomes constant (i.e., the change in weight of the sample hybrid material becomes 0.5% or less per hour).

With respect to the dried sample hybrid material, the weights of the organic domain and the inorganic domain are determined as follows. By X-ray fluorescence spectrometry, the weights of the silicon atom, the divalent metal atom and the aluminum atom are determined in terms of the weights of oxides thereof, and the total weight of the silicon oxide, the divalent metal oxide and the aluminum oxide is defined as the weight of the inorganic domain. Separately, the sample hybrid material is heated in air by using an electric furnace to elevate the temperature of the sample hybrid material from room temperature to 1,000° C. at a rate of 25° C./min, followed by maintaining the temperature at 1,000° C. for 10 minutes, to thereby calcine the sample hybrid material. The resultant ash is analyzed by various elemental analyses.

From the results of the X-ray fluorescence spectrometry and the decrease in weight of the sample hybrid material which is caused by the calcination, the weight of the organic domain is obtained. From the obtained weights of the organic domain and the inorganic domain, the organic domain/inorganic domain weight ratio of the sample hybrid material is obtained. Further, the sample hybrid material is subjected to infrared spectroscopy to obtain the ratio (peak intensity ratio) of the intensity of the absorbance peak ascribed to the carbonyl moiety of a carboxylic acid group of the organic domain to the intensity of the absorbance peak ascribed to an —O—Si—O— linkage of the inorganic domain. Based on the relationship between the organic domain/inorganic domain weight ratios of the samples and the peak intensity ratios of the samples, a calibration curve is prepared.

With respect to each of the hybrid materials produced in the Examples and Comparative Examples, the organic domain/inorganic domain weight ratio thereof is obtained by infrared spectroscopy, using the obtained calibration curve. Specifically, the hybrid material is subjected to the above-mentioned infrared spectroscopy to obtain a peak intensity ratio as defined above. From the results of the infrared spectroscopy, the organic domain/inorganic domain weight ratio of the hybrid material is obtained using the above-mentioned calibration curve.

②  Transparency

With respect to a dried hybrid material, wherein the weight of the hybrid material has become constant (i.e., the change in weight of the hybrid material has become 0.5% or less per hour) by the above-mentioned drying operation, the transparency thereof is evaluated as follows. To the hybrid material is added water in an amount which is 9 times as large as the weight of the hybrid material. The resultant mixture is placed in a cell having an optical path length of 2 mm, and the transmitted light ratios of the hybrid material to water are measured by spectrophotometry at wavelengths of 450 nm, 550 nm and 660 nm. When the average value of the transmitted light ratios measured at the above-mentioned three wavelengths is 10% or more, the hybrid material is evaluated as being substantially transparent.

EXAMPLE 1

(1) Synthesis of a Water-soluble Organic Polymer

In a separable flask, 10 parts by weight of acrylic acid and 90 parts by weight of purified water were mixed together at 60° C. in a nitrogen atmosphere while stirring. Then, into the separable flask were charged parts by weight of a 1% by weight aqueous solution of 2,2'-azobis(2-(2-imidazoline-2-yl)propane)-dihydrochloride (VA-044, manufactured and sold by Wako Pure Chemical Industries, Ltd., Japan). The resultant mixture was stirred at 60° C. in a nitrogen atmosphere for 1 hour to obtain polyacrylic acid X. The weight average molecular weight of polyacrylic acid X was measured and found to be 500,000.

(2) Synthesis a Hybrid Material

To 5 g of a 10 t by weight aqueous solution of polyacrylic acid X were added, in this order, 2.78 g of a 10% by weight aqueous solution of sodium hydroxide and 3.95 g of a 10% by weight aqueous solution of sodium metasilicate nonahydrate. The resultant mixture was stirred for 10 minutes to obtain mixture A. Mixture A and 4.75 g of a 10% by weight aqueous solution of calcium nitrate tetrahydrate which had separately been prepared were gradually mixed together while stirring, thereby obtaining a transparent, water-containing gel of a hybrid material. The pH of the resultant mixture containing the gel was measured and found to be 12.

The water-containing gel of the hybrid material was placed in a 200 ml-plastic container. Then, the hybrid material was subjected to a first washing operation as follows. Purified water was charged into the plastic container so that the total weight of the plastic container and the contents of the plastic container became 180 g. The contents of the plastic container were subjected to a first centrifugal sedimentation using a centrifuge (Centra MP 4 type, manufactured and sold by International Equipment Company, U.S.), followed by removing the supernatant of the resultant mixture from the plastic container to obtain a water-containing gel of the hybrid material as a sediment. Then, the resultant sediment was subjected to a second washing operation as follows. Purified water was charged again into the plastic container so that the total weight of the plastic container and the contents of the plastic container became 180 g. The contents of the plastic container were subjected to a second centrifugal sedimentation using the centrifuge, followed by removing the supernatant of the resultant mixture from the plastic container to obtain a water-containing gel of the hybrid material as a sediment. Then, the gel of the hybrid material was subjected to drying at 60° C. under a pressure of 10 mmHg until the weight of the hybrid material becomes constant, wherein the "constant" is as defined above. The weight of the dried hybrid material was measured. Then, the dried hybrid material was subjected to a third washing operation (including a third centrifugal sedimentation) conducted in the same manner as mentioned above, to thereby obtain a water-containing gel of the hybrid material as a sediment. The obtained water-containing gel was subjected to drying in the same manner as mentioned above to obtain a final dried hybrid material. The weight of the final dried hybrid material was measured. It was found that there was substantially no difference in dry weight between the hybrid material before the third washing operation and the hybrid material after the third washing operation. Further, the weight ratio of the water-containing gel of the hybrid material after the third washing operation to the final dried hybrid material obtained by drying the gel after the third washing operation was calculated as water absorptivity of the hybrid material and was found to be 25 in terms of the weight ratio of the water-containing gel of the hybrid material after the third washing operation to the final dried hybrid material obtained by drying the gel after the third washing operation.

The thus obtained dried hybrid material was subjected to infrared spectroscopy. As a result, an absorbance peak at 970cm$^{-1}$ (which is ascribed to an —O—Si—O— linkage) and an absorbance peak at 1,560 cm$^{-1}$ (which is ascribed to the carbonyl moiety of a carboxylic acid group) were observed. Thus, it was confirmed that the functional groups of polyacrylic acid X were ionically bonded to the —O—Si—O— linkages through calcium atoms. The organic domain/inorganic domain weight ratio was found to be 1.9.

The transparency of the hybrid material was evaluated in accordance with the above-mentioned method. As a result, the hybrid material (in the form of a mixture thereof with water) was found to be substantially transparent.

Further, the pH-response property of the hybrid material was evaluated as follows. 1 g of the hybrid material was added to 10 g of a 2 N hydrochloric acid, with the result that the hybrid material was rapidly dissolved in the hydrochloric acid. To the resultant solution was added 10 g of a 2 N aqueous sodium hydroxide solution, with the result that a transparent, water-containing gel of the hybrid material was rapidly regenerated. The regenerated hybrid material was subjected to the above-mentioned infrared spectroscopy. As a result, it was confirmed that the functional groups of polyacrylic acid X were ionically bonded to the —O—Si—O— linkages through calcium atoms. Thus, it was confirmed that the hybrid material had excellent pH-response property.

Further, the hybrid material was observed through a scanning electron microscope (S-2700, manufactured and sold by Hitachi, Ltd., Japan) at a magnification of ×10,000. As a result, no particulate body was observed and, thus, it was confirmed that the inorganic domain of the hybrid material had a size of 50 nm or less. Further, the hybrid material was subjected to X-ray diffractometry. As a result, it was confirmed that a layered structure having planer arrangement of calcium atoms and oxygen atoms was present in the hybrid material, as in the case of calcium silicate hydrate.

The production conditions and the results of the measurements are shown in Table 1.

EXAMPLE 2

(1) Synthesis of a Water-soluble Organic Polymer

In a separable flask, 5 parts by weight of acrylic acid, 5 parts by weight of 2-acrylamide-2-methylpropanesulfonic acid and 90 parts by weight of purified water were mixed together at 60° C. in a nitrogen atmosphere while stirring. Into the separable flask were charged 5 parts by weight of a 1% by weight aqueous solution of 2,2'-azobis(2-(2-imidazoline-2-yl)propane)-dihydrochloride (VA-044, manufactured and sold by Wako Pure Chemical Industries, Ltd., Japan). The resultant mixture was stirred at 60° C. in a nitrogen atmosphere for 1 hour to obtain copolymer Y of acrylic acid with 2-acrylamide-2-methylpropanesulfonic acid. The weight average molecular weight of copolymer Y was measured and found to be 400,000.

(2) Synthesis a Hybrid Material

To 5 g of a 10% by weight aqueous solution of copolymer Y (which is a copolymer of acrylic acid with 2-acrylamide-2-methylpropanesulfonic acid) were added, in this order, 1.875 g of a 10% by weight aqueous solution of sodium hydroxide and 3.95 g of a 10% by weight aqueous solution of sodium metasilicate nonahydrate. The resultant mixture was stirred for 10 minutes to obtain mixture B. Mixture B and 4.75 g of a 10% by weight aqueous solution of calcium nitrate tetrahydrate which had been separately prepared were gradually mixed together while stirring, thereby obtaining a transparent, water-containing gel of a hybrid material. The pH of the resultant mixture containing the gel was measured and found to be 12. The water-containing gel obtained was subjected to washing operations and drying operations in substantially the same manner as in Example 1 to thereby obtain a final dried hybrid material, and it was confirmed that there was substantially no difference in dry weight between the hybrid material before the third washing operation and the hybrid material after the third washing operation. The water absorptivity of the final dried hybrid material was measured in substantially the same manner as in Example 1, and found to be 20 in terms of the weight ratio of the water-containing gel of the hybrid material after the third washing operation to the final dried hybrid material obtained by drying the gel after the third washing operation. The final dried hybrid material was subjected to infrared spectroscopy. As a result, an absorbance peak at 970 cm$^{-1}$ (which is ascribed to an —O—Si—O— linkage) and an absorbance peak at 1,560 cm$^{-1}$ (which is ascribed to the carbonyl moiety of a carboxylic acid group) were observed. Thus, it was confirmed that the functional groups of copolymer Y were ionically bonded to the —O—Si—O— linkages through calcium atoms. The organic domain/inorganic domain weight ratio was found to be 1.6.

The transparency of the hybrid material was evaluated in accordance with the above-mentioned method. As a result, the hybrid material (in the form of a mixture thereof with water) was found to be substantially transparent.

Further, the pH-response property of the hybrid material was evaluated in substantially the same manner as in Example 1. As a result, it was confirmed that the hybrid material had excellent pH-response property.

The production conditions and the results of the measurements are shown in Table 1.

EXAMPLE 3

A water-containing gel of a hybrid material was produced in substantially the same manner as in Example 1, except that the amount of the 10% by weight aqueous solution of sodium metasilicate nonahydrate was changed to 3.36 g and that, instead of 4.75 g of a 10% by weight aqueous solution of calcium nitrate tetrahydrate, a mixed solution of 4.75 g of a 10% by weight aqueous solution of calcium nitrate tetrahydrate and 0.50 g of a 10% by weight aqueous solution of aluminum chloride hexahydrate was used. The pH of the resultant mixture containing the gel was measured and found to be 11. The water-containing gel obtained was subjected to washing operations and drying operations in substantially the same manner as in Example 1 to thereby obtain a final dried hybrid material, and it was confirmed that there was substantially no difference in dry weight between the hybrid material before the third washing operation and the hybrid material after the third washing operation. The water absorptivity of the hybrid material was measured in substantially the same manner as in Example 1 and was found to be 22 in terms of the weight ratio of the water-containing gel of the hybrid material after the third washing operation to the final dried hybrid material obtained by drying the gel after the third washing operation. The final dried hybrid material was subjected to infrared spectroscopy. As a result, an absorbance peak at 970 $cm^{-1}$ (which is ascribed to an —O—Si—O— linkage) and an absorbance peak at 1,560 $cm^{-1}$ (which is ascribed to the carbonyl moiety of a carboxylic acid group) were observed. Thus, it was confirmed that the functional groups of the polyacrylic acid were ionically bonded to the —O—Si—O— linkages through calcium atoms. The organic domain/inorganic domain weight ratio was found to be 1.8.

The transparency of the hybrid material was evaluated in accordance with the above-mentioned method. As a result, the hybrid material (in the form of a mixture thereof with water) was found to be substantially transparent.

Further, the pH-response property of the hybrid material was evaluated in substantially the same manner as in Example 1. As a result, it was confirmed that the hybrid material had excellent pH-response property.

The production conditions and the results of the measurements are shown in Table 1.

EXAMPLE 4

(1) Synthesis of a Water-soluble Organic Polymer

In a separable flask, 4 parts by weight of acrylic acid, 4 parts by weight of 2-acrylamide-2-methylpropanesulfonic acid, 2 parts by weight of phenoxy(polyethylene glycol) acrylate (LIGHTACRYLATE P-200A, manufactured and sold by KYOEISHA CEMICAL Co. LTD., Japan), 45 parts by weight of purified water and 45 parts by weight of acetone were mixed together at 60° C. in a nitrogen atmosphere while stirring. Into the separable flask were charged 5 parts by weight of a 1% by weight aqueous solution of 2,2'-azobis(2-(2-imidazoline-2-yl)propane)dihydrochloride (VA-044, manufactured and sold by Wako Pure Chemical Industries, Ltd., Japan). The resultant mixture was stirred at 60° C. in a nitrogen atmosphere for 1 hour to obtain copolymer Z of acrylic acid, 2-acrylamide-2-methylpropanesulfonic acid and phenoxy(polyethylene glycol)acrylate. Copolymer Z was uniformly dissolved in the water/acetone mixed solvent. The weight average molecular weight of copolymer Z was measured and found to be 150,000.

(2) Synthesis a Hybrid Material

A 10% by weight solution of copolymer Z (which is a copolymer of acrylic acid, 2-acrylamide-2-methylpropanesulfonic acid and phenoxy(polyethylene glycol)acrylate) in a mixed solvent of water and acetone was prepared, wherein the water/acetone weight ratio was 1/1. To 5 g of the prepared 10% by weight solution of copolymer Z were added, in this order, 1.5 g of a 10% by weight aqueous solution of sodium hydroxide and 3.95 g of a 10% by weight aqueous solution of sodium metasilicate nonahydrate. The resultant mixture was stirred for 10 minutes to obtain mixture C. Mixture C and 4.75 g of a 10% by weight aqueous solution of calcium nitrate tetrahydrate which had been separately prepared were gradually mixed together while stirring, thereby obtaining a transparent, water-containing gel of a hybrid material. The pH of resultant mixture containing the gel was measured and found to be 12. The water-containing gel obtained was subjected to washing operations and drying operations in substantially the same manner as in Example 1 to obtain a final dried hybrid material, and it was confirmed that there was substantially no difference in dry weight between the hybrid material before the third washing operation and the hybrid material after the third washing operation. The water absorptivity of the final dried hybrid material was measured in substantially the same manner as in Example 1 and found to be 18 in terms of the weight ratio of the water-containing gel of the hybrid material after the third washing operation to the final dried hybrid material obtained by drying the gel after the third washing operation. The final dried hybrid material was subjected to infrared spectroscopy. As a result, an absorbance peak at 970 $cm^{-1}$ (which is ascribed to an —O—Si—O— linkage) and an absorbance peak at 1,560 $cm^{-1}$ (which is ascribed to the carbonyl moiety of a carboxylic acid group) were observed. Thus, it was confirmed that the functional groups of copolymer Z were ionically bonded to the —O—Si—O— linkages through calcium atoms. The organic domain/inorganic domain weight ratio was found to be 2.0.

The transparency of the hybrid material was evaluated in accordance with the above-mentioned method. As a result, the hybrid material (in the form of a mixture thereof with water) was found to be substantially transparent.

Further, the pH-response property of the hybrid material was evaluated in substantially the same manner as in Example 1. As a result, it was confirmed that the hybrid material had excellent pH-response property.

The production conditions and the results of the measurements are shown in Table 1.

EXAMPLE 5

A transparent, water-containing gel of a hybrid material was produced in substantially the same manner as in Example 2, except that, instead of 4.75 g of a 10% by weight aqueous solution of calcium nitrate tatrahydrate, 4.75 g of a 10.8% by weight aqueous solution of magnesium nitrate hexahydrate was used. The pH of the resultant mixture containing the gel was measured and found to be 12. The water-containing gel obtained was subjected to washing operations and drying operations in substantially the same manner as in Example 1 to thereby obtain a final dried hybrid material, and it was confirmed that there was substantially no difference in dry weight between the hybrid material before the third washing operation and the hybrid material after the third washing operation. The water absorptivity of the hybrid material was measured in substantially the same manner as in Example 1, and found to be 23 in terms of the weight ratio of the water-containing gel of the hybrid material after the third washing operation to the final dried hybrid material obtained by drying the gel after the third washing operation Further, the final dried hybrid material was subjected to infrared spectroscopy. As a result, an absorbance peak at 1040 $cm^{-1}$ (which is ascribed to an —O—Si—O— linkage) and an absorbance peak at 1,560 $cm^{-1}$ (which is ascribed to the carbonyl moiety of a carboxylic acid group) were observed. Therefore, it was confirmed that the functional groups of copolymer Y were ionically bonded to the —O—Si—O— linkages through calcium atoms. The organic domain/inorganic domain weight ratio was found to be 1.9.

The transparency of the hybrid material was evaluated in accordance with the above-mentioned method. As a result, the hybrid material (in the form of a mixture thereof with water) was found to be substantially transparent.

Further, the pH-response property of the hybrid material was evaluated in substantially the same manner as in Example 1. As a result, it was confirmed that the hybrid material had excellent pH-response property.

The production conditions and the results of the measurements are shown in Table 1.

EXAMPLE 6

A 10% by weight aqueous solution of polyacrylic acid X was prepared in substantially the same manner as in Example 1. To 5 g of the 10% by weight aqueous solution of polyacrylic acid X were added, in this order, 2 g of a 1 N hydrochloric acid, 3.95 g of a 10% by weight aqueous solution of sodium metasilicate nonahydrate and 4.75 g of a 10% by weight aqueous solution of calcium nitrate tetrahydrate. The resultant mixture was stirred for 10 minutes to obtain mixture D. Mixture D and 3.58 g of a 10% by weight aqueous solution of sodium hydroxide which had separately been prepared were gradually mixed together while stirring, thereby obtaining a transparent, water-containing gel of a hybrid material. The pH of the resultant mixture containing the gel was measured and found to be 12. The water-containing gel obtained was subjected to washing operations and drying operations in substantially the same manner as in Example 1 to thereby obtain a final dried hybrid material, and it was confirmed that there was substantially no difference in dry weight between the hybrid material before the third washing operation and the hybrid material after the third washing operation. The water absorptivity of the hybrid material was measured in substantially the same manner as in Example 1, and found to be 25 in terms of the weight ratio of the water-containing gel of the hybrid material after the third washing operation to the final dried hybrid material obtained by drying the gel after the third washing operation. The final dried hybrid material was subjected to infrared spectroscopy. As a result, an absorbance peak at 970 cm$^{-1}$ (which is ascribed to an —O—Si—O— linkage) and an absorbance at 1,560 cm$^{-1}$ (which is ascribed to the carbonyl moiety of a carboxylic acid group) were observed. Thus, it was confirmed that the functional groups of polyacrylic acid X were ionically bonded to the —O—Si—O— linkages through calcium atoms. The organic domain/inorganic domain weight ratio was found to be 1.9.

The transparency of the hybrid material was evaluated in accordance with the above-mentioned method. As a result, the hybrid material (in the form of a mixture thereof with water) was found to be substantially transparent.

Further, the pH-response property of the hybrid material was evaluated in substantially the same manner as in Example 1. As a result, it was confirmed that the hybrid material had excellent pH-response property.

The production conditions and the results of the measurements are shown in Table 1.

EXAMPLE 7

A transparent, water-containing gel of a hybrid material was produced in substantially the same manner as in Example 1, except that, instead of 5 g of a 10% by weight aqueous solution of polyacryllc acid X, 20 g of a 2.5% by weight aqueous solution of a polyacrylic acid (JURYMER AC-10SH, manufactured and sold by NIHON JUNYAKU CO., LTD., Japan; weight average molecular weight; 1,500,000) was used and that the amount of the 10% by weight aqueous solution of sodium hydroxide was changed to 4.17 g. The pH of the resultant mixture containing the gel was measured and found to be 12. The water-containing gel obtained was subjected to washing operations and drying operations in substantially the same manner as in Example 1 to thereby obtain a final dried hybrid material, and it was confirmed that there was substantially no difference in dry weight between the hybrid material before the third washing operation and the hybrid material after the third washing operation. The water absorptivity of the hybrid material was measured in substantially the same manner as in Example 1 and found to be 26 in terms of the weight ratio of the water-containing gel of the hybrid material after the third washing operation to the final dried hybrid material obtained by drying the gel after the third washing operation. The final dried hybrid material was subjected to infrared spectroscopy. As a result, an absorbance peak at 970 cm$^{-1}$ (which is ascribed to an —O—Si—O— linkage) and an absorbance peak at 1,560 cm$^{-1}$ (which is ascribed to the carbonyl moiety of a carboxylic acid group) were observed. Thus, it was confirmed that the functional groups of the polyacrylic acid were tonically bonded to the —O—Si—O— linkages through calcium atoms. The organic domain/norganic domain weight ratio was found to be 1.9.

The transparency of the hybrid material was evaluated in accordance with the above-mentioned method. As a result, the hybrid material (in the form of a mixture thereof with water) was found to be substantially transparent.

Further, the pH-response property of the hybrid material was evaluated in substantially the same manner as in Example 1. As a result, it was confirmed that the hybrid material had excellent pH-response property.

In addition, the final dried hybrid material was subjected to X-ray diffractometry. As a result, it was confirmed that a layered structure in which the calcium (Ca) atoms and the oxygen (O) atoms are arranged in at least one plane to form at least one CaO layer, as in the case of calcium silicate hydrate.

The production conditions and the results of the measurements are shown in Table 1.

EXAMPLE 8

A transparent, water-containing gel of a hybrid material was produced in substantially the same manner as in Example 1, except that, instead of 5 g of a 10% by weight aqueous solution of polyacrylic acid X, 5 g of a 10% by weight aqueous solution of a polyacrylic acid (JURYMER AC-10H, manufactured and sold by NIHON JUNYAKU CO., LTD., Japan; weight average molecular weight: 300,000) was used and that the amount of the 10% by weight aqueous solution of sodium hydroxide was changed to 4.17 g. The pH of the resultant mixture containing the gel was measured and found to be 12. The water-containing gel obtained was subjected to washing operations and drying operations in substantially the same manner as in Example 1 to thereby obtain a final dried hybrid material, and it was confirmed that there was substantially no difference in dry weight between the hybrid material before the third washing operation and the hybrid material after the third washing operation. The water absorptivity of the hybrid material was measured in substantially the same manner as in Example 1, and found to be 24 in terms of the weight ratio of the water-containing gel of the hybrid material after the third washing operation to the final dried hybrid material obtained by drying the gel after the third washing operation. The final dried hybrid material was subjected to infrared spectroscopy. As a result, an absorbance peak at 970 cm$^{-1}$ (which is ascribed to an —O—Si—O— linkage) and an absorbance peak at 1,560 cm$^{-1}$ (which is ascribed to the carbonyl moiety of a carboxylic acid group) were observed. Thus, it was confirmed that the functional groups of the polyacrylic acid were tonically bonded to the —O—Si—O— linkages through calcium atoms. The organic domain/inorganic domain weight ratio was found to be 1.9.

The transparency of the hybrid material was evaluated in accordance with the above-mentioned method. As a result, the hybrid material (in the form of a mixture thereof with water) was found to be substantially transparent.

Further, the pH-response property of the hybrid material was evaluated in substantially the same manner as in Example 1. As a result, it was confirmed that the hybrid material had excellent pH-response property.

In addition, the hybrid material was observed through a scanning electron microscope (S-2700, manufactured and sold by Hitachi, Ltd., Japan) at a magnification of ×10,000. As a result, no particulate body was observed and, thus, it was confirmed that the inorganic domain of the hybrid material had a size of 50 nm or less.

The production conditions and the results of the measurements are shown in Table 1.

EXAMPLE 9

A transparent, water-containing gel of a hybrid material was produced in substantially the same manner as in Example 8, except that, instead of polyacrylic acid "JURYMER AC-10H", another polyacrylic acid (JURYMER AC-10M, manufactured and sold by NIHON JUN-YAU CO., LTD., Japan; weight average molecular weight: 120,000) was used. The pH of the resultant mixture containing the gel was measured and found to be 12. The water-containing gel obtained was subjected to washing operations and drying operations in substantially the same manner as in Example 1 to obtain a final dried hybrid material, and it was confirmed that there was substantially no difference in dry weight between the hybrid material before the third washing operation and the hybrid material after the third washing operation. The water absorptivity of the hybrid material was measured in substantially the same manner as in Example 1, and found to be 20 in terms of the weight ratio of the water-containing gel of the hybrid material after the third washing operation to the final dried hybrid material obtained by drying the gel after the third washing operation. The final dried hybrid material was subjected to infrared spectroscopy. As a result, an absorbance peak at 970 cm$^{-1}$ (which is ascribed to an —O—Si—O— linkage) and an absorbance peak at 1,560 cm$^{-1}$ (which is ascribed to the carbonyl moiety of a carboxylic acid group) were observed. Thus, it was confirmed that the functional groups of the polyacrylic acid were ionically bonded to the —O—Si—O— linkages through calcium atoms. The organic domain/inorganic domain weight ratio was found to be 1.8.

The transparency of the hybrid material was evaluated in accordance with the above-mentioned method. As a result, the hybrid material (in the form of a mixture thereof with water) was found to be substantially transparent.

Further, the pH-response property of the hybrid material was evaluated in substantially the same manner as in Example 1. As a result, it was confirmed that the hybrid material had excellent pH-response property.

The production conditions and the results of the measurements are shown in Table 1.

EXAMPLE 10

A bluish transparent, water-containing gel of a hybrid material was produced in substantially the same manner as in Example 7, except that, instead of 4.75 g of a 10% by weight aqueous solution of calcium nitrate tetrahydrate, 4.75 g of a 10.6% by weight aqueous solution of copper(II) sulfate pentahydrate was used. The pH of the resultant mixture containing the gel was measured and found to be 11. The water-containing gel obtained was subjected to washing operations and drying operations in substantially the same manner as in Example 1 to obtain a final dried hybrid material, and it was confirmed that there was substantially no difference in dry weight between the hybrid material before the third washing operation and the hybrid material after the third washing operation. The water absorptivity of the hybrid material was measured in substantially the same manner as in Example 1, and found to be 37 in terms of the weight ratio of the water-containing gel of the hybrid material after the third washing operation to the final dried hybrid material obtained by drying the gel after the third washing operation. The final dried hybrid material in was subjected to infrared spectroscopy. As a result, an absorbance peak at 1,010 cm$^{-1}$ (which is ascribed to an —O—Si—O— linkage) and an absorbance at 1,560 cm$^{-1}$ (which is ascribed to the carbonyl moiety of a carboxylic acid group) were observed. Thus, it was confirmed that the functional groups of the polyacrylic acid were ionically bonded to the —O—Si—O— linkages through copper atoms. The organic domain/inorganic domain weight ratio was found to be 1.1.

The transparency of the hybrid material was evaluated in accordance with the above-mentioned method. As a result, the hybrid material (in the form of a mixture thereof with water) was found to be substantially transparent.

Further, the pH-response property of the hybrid material was evaluated in substantially the same manner as in Example 1. As a result, it was confirmed that the hybrid material had excellent pH-response property.

In addition, the hybrid material was observed through a scanning electron microscope (S-2700, manufactured and sold by Hitachi, Ltd., Japan) at a magnification of ×10,000. As a result, no particulate body was observed and, thus, it was confirmed that the inorganic domain of the hybrid material had a size of 50 nm or less.

The production conditions and the results of the measurements are shown in Table 1.

EXAMPLE 11

A greenish transparent, water-containing gel of a hybrid material was produced in substantially the same manner as in Example 7, except that, instead of 4.75 g of a 10% by weight aqueous solution of calcium nitrate tetrahydrate, 4.75 g of a 12.3% by weight aqueous solution of nickel(II) nitrate hexahydrate was used. The pH of the resultant mixture containing the gel was measured and found to be 12. The water-containing gel obtained was subjected to washing operations and drying operations in substantially the same manner as in Example 1 to obtain a final dried hybrid material, and it was confirmed that there was substantially no difference in dry weight between the hybrid material before the third washing operation and the hybrid material after the third washing operation. The water absorptivity of the hybrid material was measured in substantially the same manner as in Example 1, and found to be 20 in terms of the weight ratio of the water-containing gel of the hybrid material after the third washing operation to the final dried hybrid material obtained by drying the gel after the third washing operation. The final dried hybrid material was subjected to infrared spectroscopy. As a result, an absorbance peak at 1,040 cm$^{-1}$ (which is ascribed to an —O—Si—O— linkage) and an absorbance peak at 1,560 cm$^{-1}$ (which is ascribed to the carbonyl moiety of a carboxylic acid group) were observed. Thus, it was confirmed that the functional groups of the polyacrylic acid were ionically bonded to the —O—Si—O— linkages through nickel atoms. The organic domain/inorganic domain weight ratio was found to be 1.2.

The transparency of the hybrid material was evaluated in accordance with the above-mentioned method. As a result, the hybrid material (in the form of a mixture thereof with water) was found to be substantially transparent.

Further, the pH-response property of the hybrid material was evaluated in substantially the same manner as in Example 1. As a result, it was confirmed that the hybrid material had excellent pH-response property.

The production conditions and the results of the measurements are shown in Table 1.

EXAMPLE 12

A transparent, water-containing gel of a hybrid material was produced in substantially the same manner as in Example 7, except that, instead of 3.95 g of a 10% by weight aqueous solution of sodium metasilicate nonahydrate, 0.52 g of a 20% by weight colloidal silica (SNOWTEX UP, manufactured and sold by Nissan Chemical Industries, LTD., Japan) was used and that the amount of the 10% by weight aqueous solution of sodium hydroxide was changed to 2.78 g. The pH of the resultant mixture containing the gel was measured and found 5 to be 9. The water-containing gel obtained was subjected to washing operations and drying operations in substantially the same manner as in Example 1 to thereby obtain a final dried hybrid material, and it was confirmed that there was substantially no difference in dry weight between the hybrid material before the third washing and the hybrid material after the third washing. The water absorptivity of the hybrid material was measured in substantially the same manner as in Example 1, and found to be 25 in terms of the weight ratio of the water-containing gel of the hybrid material after the third washing operation to the final dried hybrid material obtained by drying the gel after the third washing operation. The final dried hybrid material was subjected to infrared spectroscopy. As a result, an absorbance at 970 cm$^{-1}$ (which is ascribed to an —O—Si—O— linkage) and an absorbance at 1,560 cm$^{-1}$ (which is ascribed to the carbonyl moiety of a carboxylic acid group) were observed. Thus, it was confirmed that the functional groups of the polyacrylic acid were ionically bonded to the —O—Si—O— linkages through calcium atoms. The organic domain/inorganic domain weight ratio was found to be 1.9.

The transparency of the hybrid material was evaluated in accordance with the above-mentioned method. As a result, the hybrid material (in the form of a mixture thereof with water) was found to be substantially transparent.

Further, the pH-response property of the hybrid material was evaluated in substantially the same manner as in Example 1. As a result, it was confirmed that the hybrid material had excellent pH-response property.

The production conditions and the results of the measurements are shown in Table 1.

EXAMPLE 13

A transparent, water-containing gel of a hybrid material was produced in substantially the same manner as in Example 7, except that, instead of 20 g of a 2.5% by weight aqueous solution of a polyacrylic acid (JURYMER AC-10SH, manufactured and sold by NIHON JUNYA-KU CO., LTD., Japan), 20 g of a 2.5% by weight aqueous solution of sodium alginate (DUCKALGIN NSPH, manufactured and sold by KIBUN FOOD CHEMIFA Co., Ltd., Japan; weight average molecular weight: 250,000) was used and that an aqueous solution of sodium hydroxide was not used. The pH of the resultant mixture containing the gel was measured and found to be 12. The water-containing gel obtained was subjected to washing operations and drying operations in substantially the same manner as in Example 1 to thereby obtain a final dried hybrid material, and it was confirmed that there was substantially no difference in dry weight between the hybrid material before the third washing operation and the hybrid material after the third washing operation. The water absorptivity of the hybrid material was measured in substantially the same manner as in Example 1, and found to be 42 in terms of the weight ratio of the water-containing gel of the hybrid material after the third washing operation to the final dried hybrid material obtained by drying the gel after the third washing operation. The final dried hybrid material was subjected to infrared spectroscopy. As a result, an absorbance peak at 970 cm$^{-1}$ (which is ascribed to an —O—Si—O— linkage) and an absorbance peak at 1,560 cm$^{-1}$ (which is ascribed to the carbonyl moiety of a carboxylic acid group) were observed. Thus, it was confirmed that the functional groups of the alginic acid were ionically bonded to the —O—S—O— linkages through calcium atoms. The organic domain/inorganic domain weight ratio was found to be 2.0.

The transparency of the hybrid material was evaluated in accordance with the above-mentioned method. As a result, the hybrid material (in the form of a mixture thereof with water) was found to be substantially transparent.

Further, the pH-response property of the hybrid material was evaluated in substantially the same manner as in Example 1. As a result, it was confirmed that the hybrid material had excellent pH-response property.

The production conditions and the results of the measurements are shown in Table 1.

EXAMPLE 14

A transparent, water-containing gel of a hybrid material was produced in substantially the same manner as in Example 7, except that the amount of the 10% by weight aqueous solution of sodium metasilicate nonahydrate was changed to 5.92 g and that the amount of a 10% by weight aqueous solution of calcium nitrate tetrahydrate was changed to 7.12 g. The pH of the resultant mixture containing the gel was measured and found to be 12. The water-containing gel obtained was subjected to washing operations and drying operations in substantially the same manner as in Example 1 to thereby obtain a final dried hybrid material, and it was confirmed that there was substantially no difference in dry weight between the hybrid material before the third washing operation and the hybrid material after the third washing operation. The water absorptivity of the hybrid material was measured in substantially the same manner as in Example 1, and found to be 18 in terms of the weight ratio of the water-containing gel of the hybrid material after the third washing operation to the final dried hybrid material obtained by drying the gel after the third washing operation. The final dried hybrid material was subjected to infrared spectroscopy. As a result, an absorbance peak at 970 cm$^{-1}$ (which is ascribed to an —O—Si—O— linkage) and an absorbance peak at 1,560 cm$^{-1}$ (which is ascribed to the carbonyl moiety of a carboxylic acid group) were observed. Thus, it was confirmed that the functional groups of the polyacrylic acid were ionically bonded to the —O—Si—O— linkages through calcium atoms. The organic domain/inorganic domain weight ratio was found to be 1.3.

The transparency of the hybrid material was evaluated in accordance with the above-mentioned method. As a result, the hybrid material (in the form of a mixture thereof with water) was found to be substantially transparent.

Further, the pH-response property of the hybrid material was evaluated in substantially the same manner as in Example 1. As a result, it was confirmed that the hybrid material had excellent pH-response property.

The production conditions and the results of the measurements are shown in Table 1.

EXAMPLE 15

A transparent, water-containing gel of a hybrid material was produced in substantially the same manner as in Example 7, except that, instead of 4.17 g of a 10% by weight aqueous solution of sodium hydroxide, 5.54 g of a 6.25% by weight aqueous solution of sodium hydroxide, that the amount of a 10% by weight aqueous solution of sodium metasilicate nonahydrate was changed to 6.73 g and that the amount of a 10% by weight agueous solution of calcium nitrate tetrahydrate was changed to 2.98 g. The pH of the resultant mixture containing the gel was measured and found to be 12. The water-containing gel obtained was subjected to washing operations and drying operations in substantially the same manner as in Example 1 to thereby obtain a final dried hybrid material, and it was confirmed that there was substantially no difference in dry weight between the hybrid material before the third washing and the hybrid material after the third washing. The water absorptivity of the hybrid material was measured in substantially the same manner as in Example 1, and found to be 35 in terms of the weight ratio of the water-containing gel of the hybrid material after the third washing operation to the final dried hybrid material obtained by drying the gel after the third washing operation. The final dried hybrid material was subjected to infrared spectroscopy. As a result, an absorbance at 970 cm$^{-1}$ (which is ascribed to an —O—Si—O— linkage) and an absorbance at 1,560 cm$^{-1}$ (which is ascribed to the carbonyl moiety of a carboxylic acid group) were observed. Thus, it was confirmed that the functional groups of the polyacrylic acid were ionically bonded to the —O—Si—O— linkages through calcium atoms. The organic domain/inorganic domain weight ratio was found to be 1.3.

The transparency of the hybrid material was evaluated in accordance with the above-mentioned method. As a result, the hybrid material (in the form of a mixture thereof with water) was found to be substantially transparent.

Further, the pH-response property of the hybrid material was evaluated in substantially the same manner as in Example 1. As a result, it was confirmed that the hybrid material had the pH-response property.

The production conditions and the results of the measurements are shown in Table 1.

EXAMPLE 16

Substantially the same procedure as conducted in Example 7 for producing a water-containing gel of a hybrid material was repeated, except that the amount of a 10% by weight aqueous solution of sodium hydroxide was changed to 11.1 g. As a result, a white, water-containing hybrid material was obtained. The pH of the resultant mixture containing the white, water-containing hybrid material was measured and found to be more than 13. The white, water-containing hybrid material was subjected to washing operations and drying operations in substantially the same manner as in Example 1 to thereby obtain a final dried hybrid material, and it was confirmed that there was substantially no difference in dry weight between the hybrid material before the third washing operation and the hybrid material after the third washing operation. The water absorptivity of the hybrid material was measured in substantially the same manner as in Example 1, and found to be 13 in terms of the weight ratio of the water-containing hybrid material after the third washing operation to the final dried hybrid material obtained by drying the water-containing hybrid material after the third washing operation. The final dried hybrid material was subjected to infrared spectroscopy. As a result, an absorbance peak at 970 cm$^{-1}$ (which is ascribed to an —O—Si—O— linkage) and an absorbance peak at 1,560 cm$^{-1}$ (which is ascribed to the carbonyl moiety of a carboxylic acid group) were observed. Thus, it was confirmed that the functional groups of the polyacrylic acid were ionically bonded to the —O—Si—O— linkages through calcium atoms. The organic domain/inorganic domain weight ratio was found to be 1.5.

The transparency of the hybrid material was evaluated in accordance with the above-mentioned method. As a result, it was found that the hybrid material (in the form of a mixture thereof with water) was not transparent.

Further, the pH-response property of the hybrid material was evaluated in substantially the same manner as in Example 1. As a result, it was confirmed that the hybrid material had excellent pH-response property.

The production conditions and the results of the measurements are shown in Table 1.

Comparative Example 1

In a separable flask, 8 parts by weight of acrylic acid, 2 parts by weight of methylene-bis(acrylamide) and 90 parts by weight of purified water were mixed together at 60° C. in a nitrogen atmosphere while stirring. Then, into the separable flask were charged 5 parts by weight of a 1% by weight aqueous solution of 2,2'-azobis(2-(2-imidazoline-2-yl) propane)dihydrochloride (VA-044, manufactured and sold by Wako Pure Chemical Industries, Ltd., Japan). The resultant mixture was stirred at 60° C. in a nitrogen atmosphere for 1 hour to obtain polymer gel P. Polymer gel P was dried at 60° C. under a pressure of 10 mmHg for 5 hours to obtain dried polymer gel P. Then, dried polymer gel P was impregnated with water. Polymer gel P exhibited a water absorptivity of 20 or more in terms of the ratio of the weight of polymer gel P impregnated with water to the dry weight of polymer gel P.

The transparency of polymer gel P was evaluated in accordance with the above-mentioned method. As a result, polymer gel P (in the form of a mixture thereof with water) was found to be transparent.

1 g of dried polymer gel P was added to 10 g of a 2 N hydrochloric acid. However, polymer gel P was not dissolved in the hydrochloric acid and no change in appearance of polymer gel P was observed. Thus, it was confirmed that polymer gel P did not have the pH-response property.

The production conditions and the results of the measurements are shown in Table 1.

Comparative Example 2

Substantially the same procedure as conducted in Example 1 for producing a water-containing gel of a hybrid material was repeated, except that, instead of a 10% by weight aqueous solution of sodium metasilicate nonahydrate, purified water was used. As a result, a white precipitate was obtained. The pH of the liquid mixture during the formation of the white precipitate was measured and found to be 11. The precipitate was dried at 60° C. under a pressure of 10 mmHg for 5 hours. The resultant dried precipitate was impregnated with water to measure the water absorptivity of the dried precipitate. The dried precipitate was able to absorb water only in an amount which was approximately equal to the weight of the dried precipitate. The precipitate was subjected to infrared spectroscopy. As a result, an absorbance peak at 1,560 cm$^{-1}$ (which is ascribed to the carbonyl moiety of a carboxyl group) was observed. Thus, it was confirmed that the functional groups of the polyacrylic acid were tonically bonded to calcium atoms. However, an absorbance peak, which is ascribed to an —O—Si—O— linkage, was not observed.

The transparency of the white precipitate was evaluated in accordance with the above-mentioned method. As a result, it was found that the white precipitate was dispersed in water and the resultant dispersion was not transparent.

Further, the pH-response property of the white precipitate was evaluated as follows. 1 g of the white precipitate was added to 5 g of a 2 N hydrochloric acid, with the result that the white precipitate was dissolved in the hydrochloric acid. To the resultant solution was added 5 g of a 2 N aqueous sodium hydroxide solution, with the result that a white precipitate was regenerated. Therefore, the white precipitate had a pH-response property. However, the white precipitate did not contain the inorganic domain having —O—Si—O— linkages. Therefore, as mentioned above, the water absorptivity of the white precipitate was very poor.

The production conditions and the results of the measurements are shown in Table 1.

Comparative Example 3

Substantially the same procedure as conducted in Example 1 for producing a water-containing gel of a hybrid material was repeated, except that, instead of 4.75 g of a 10% by weight aqueous solution of calcium nitrate tetrahydrate, a 1 N hydrochloric acid was gradually added to mixture A until the pH of the resultant mixture became 3, to thereby obtain a solution. During the formation of the solution, no change in appearance of the solution was observed. The solution was subjected to centrifugal sedimentation in substantially the same manner as in Example 1. The resultant contained no solids.

The production conditions and the results of the measurements are shown in Table 1.

Comparative Example 4

To 5 g of a 10% by weight aqueous solution of copolymer Y obtained in Example 2 (which is a copolymer of acrylic acid with 2-acrylamide-2-methylpropane sulfonate) was added 1.875 g of a 10% by weight aqueous solution of sodium hydroxide, followed by stirring to obtain a first solution. To the first solution was added 0.69 g of calcium montmorillonite (KUNIBOND, manufactured and Sold by Kunimine Industries Co., Ltd., Japan), thereby obtaining a second solution. By the above-mentioned addition of the calcium montmorillonite. the viscosity of the solution increased (i.e., the viscosity of the second solution became higher than that of the first solution), but gelation did not occur. The pH of the second solution was measured and found to be 12. The solution was subjected to washing operations and drying operations in substantially the same manner as in Example 1. With respect to the resultant solids obtained from the solution by the above-mentioned washing and drying operations, the water absorptivity of the solution was measured in substantially the same manner as in Example 1, and found to be 3 in terms of the weight ratio of the water-containing solids after the third washing operation to the dried solids obtained by drying the above-mentioned water-containing solids.

The transparency of the solids was evaluated in accordance with the above-mentioned method. As a result, it was found that the solids (in the form of a mixture thereof with water) were not transparent.

The solids were subjected to infrared spectroscopy As a result, an absorbance peak was observed at 1,040 cm$^{-1}$, which is ascribed to an —O—Si—O— linkage, but an absorbance peak which is ascribed to organic polymer was not observed.

The production conditions and the results of the measurements are shown in Table 1.

Comparative Example 5

A solution was produced in substantially the same manner as in Comparative Example 4, except that, instead of calcium montmorillonite, 0.69 g of sodium montmorillonite (which is produced in Wyoming, U.S.A.) was used. The composition of the sodium montmorillonite was calculated from the elemental ratio determined by X-ray fluorescence spectrometry, wherein the amounts of component elements of sodium montmorillonite were calculated in terms of the amounts of oxides thereof. As a result, it was found that the sodium montmorillonite was composed of 3.7% by weight of $Na_2O$, 4.4% by weight of MgO, 19.2% by weight of $Al_2O_3$, 68.8% by weight of $SiO_2$, 0.45% by weight of $SO_3$, 0.25% by weight of $K_2O$, 0.73% by weight of CaO, 0.09% by weight of $TiO_2$, 0.04% by weight of MnO and 2.3% by weight of $Fe_2O_3$.

By the addition of sodium montmorillonite, the viscosity of the solution increased, but gelatton did not occur. The pH of the solution (to which the sodium montmorillonite had been added) was measured and found to be 12. The solution was subjected to washing operations and drying operations in substantially the same manner as in Example 1. With respect to the resultant solids obtained from the solution by the above-mentioned washing and drying operations, the water absorptivity of the solids was measured in substantially the same manner as in Example 1, and found to be 3 in terms of the weight ratio of the water-containing solids after the third washing operation to the dried solids obtained by drying the above-mentioned water-containing solids.

The transparency of the obtained solids was evaluated in accordance with the above-mentioned method. As a result, it was found that the solids (in the form of a mixture thereof with water) were not transparent.

The obtained solids were subjected to infrared spectroscopy. As a result, an absorbance peak was observed at 1,040 cm$^{-1}$, which is ascribed to an —O—Si—O— linkage, but almost no absorbance peaks which are ascribed to organic polymer were observed.

The production conditions and the results of the measurements are shown in Table 1.

Comparative Example 6

To 5 g of a 10% by weight aqueous solution of a polyacrylic acid (JURYMER AC-10H, manufactured and sold by NIHON JUNYAKU CO., LTD., Japan; weight average molecular weight: 300,000) was added 2.78 g of a 10% by weight aqueous solution of sodium hydroxide while stirring, thereby obtaining an aqueous solution of a sodium polyacrylate. Separately, to 3.95 g of a 10% by weight aqueous solution of sodium metasillcate nonahydrate was added 4.75 g of a 10% by weight aqueous solution of calcium nitrate tetrahydrate while stirring, thereby obtaining an opaque liquid mixture containing calcium silicate hydrate (CSH). The sodium polyacrylate obtained above and the opaque liquid mixture obtained above were mixed together. The resultant liquid mixture remained opaque, and gelation did not occur. The pH of the liquid mixture was measured and found to be 12. The liquid mixture was subjected to washing operations and drying operations in substantially the same manner as in Example 1 to thereby obtain white solids. The obtained white solids were subjected to infrared spectroscopy. As a result. an absorbance peak at 970 $cm^{-1}$ (which is ascribed to an —O—Si—O— linkage) and an absorbance peak at 1,560 $cm^{-1}$ (which is ascribed to the carbonyl moiety of a carboxyl group) were observed. Thus, it was confirmed that the polyacrylic acid was bonded to calcium silicate hydrate. The organic domain/inorganic domain weight ratio was found to be 0.7. The water absorptivity of the white solids was measured in substantially the same manner as in Example 1, and found to be 12 in terms of the weight ratio of the water-containing white solids after the third washing operation to the dried white solids obtained by drying the above-mentioned water-containing white solids.

The transparency of the white solids was evaluated in accordance with the above-mentioned method. As a result, it was found that the white solids were dispersed in water and the resultant dispersion was not transparent.

Further, the pH-response property of the white solids was evaluated as follows. 1 g of the white solids was added to 5 g of a 2 N hydrochloric acid, with the result that the white solids were dissolved in the hydrochloric acid. To the resultant solution was added 5 g of a 2 N aqueous sodium hydroxide solution, with the result that an opaque liquid mixture was obtained. Thus, the white solids had a pH-response property. However, the white solids had an organic domain/inorganic domain weight ratio of less than 1 and, hence, as mentioned above, the water absorptivity thereof was poor.

The production conditions and the results of the measurements are shown in Table 1.

Comparative Example 7

To 10 g of a 2.5% by weight aqueous solution of a polyacrylic acid (JURYMER AC-10SH, manufactured and sold by NIHON JUNYAKU CO., LTD., Japan; weight average molecular weight: 1,500,000) was added 2.08 g of a 10% by weight aqueous solution of sodium hydroxide, thereby obtaining an aqueous solution of a sodium polyacrylate having a pH of 12. to the obtained aqueous solution of a sodium polyacrylate was added 0.22 g of a powder of a synthesized calcium silicate, followed by stirring. By the addition of the synthesized calcium silicate, the viscosity of the aqueous solution increased, but gelation did not occur. The thus obtained liquid mixture was opaque and had a pH of 12. For hydrating the synthesized calcium silicate in the liquid mixture, the liquid mixture was intermittently stirred at room temperature for 28 days. However, there was no change in appearance of the liquid mixture, i.e., the liquid mixture remained opaque, and gelation did not occur. The liquid mixture was subjected to washing operations and drying operations in substantially the same manner as in Example 1 to thereby obtain white solids. The obtained white solids were subjected to infrared spectroscopy. As a result, an absorbance peak at 970 $cm^{-1}$ (which is ascribed to an —O—Si—O— linkage) and an absorbance peak at 1,560 $cm^{-1}$ (which is ascribed to the carbonyl moiety of a carboxyl group) were observed. Thus, it was confirmed that the polyacrylic acid was bonded to calcium silicate hydrate. The organic domain/inorganic domain weight ratio was found to be 0.2. The water absorptivity of the white solids was measured in substantially the same manner as in Example 1, and found to be 9 in terms of the weight ratio of the water-containing solids after the third washing operation to the dried solids obtained by drying the above-mentioned water-containing solids.

The transparency of the obtained white solids was evaluated in accordance with the above-mentioned method. As a result, it was found that the white solids were dispersed in water and the resultant dispersion was not transparent.

Further, the hybrid material was observed through a scanning electron microscope (S-2700, manufactured and sold by Hitachi, Ltd., Japan) at a magnification of ×10,000. As a result, it was confirmed that the solids had inorganic domains having a size of about 1 $\mu$m.

Further, the pH-response property of the white solids was evaluated as follows. 1 g of the white solids was added to 5 g of a 2 N hydrochloric acid, with the result that the white solids were dissolved in the hydrochloric acid. To the resultant solution was added 5 g of a 2 N aqueous sodium hydroxide solution, with the result that an opaque liquid mixture was obtained. Thus, the white solids had a pH-response property. However, as mentioned above, the white solids had an organic domain/inorganic domain weight ratio of less than 1 and, hence, as mentioned above, the water abosorptivity of the white solids was poor.

The production conditions and the results of the measurements are shown in Table 1.

Comparative Example 8

Substantially the same procedure as in Example 16 for producing a hybrid material was repeated, except that, instead of a polyacrylic acid (JURYMER AC-10SH, manufactured and sold by NIHON JUNYAKU CO., LTD., Japan: weight average molecular weight: 1,500,000), a polyacrylic acid (Number described in the catalogue: 03326; manufactured and sold by Polysciences, Inc., U.S.A.; weight average molecular weight; 90,000). As a result, an opaque dispersion was obtained, wherein gelation did not occur.

The thus obtained opaque dispersion had a pH of more than 13. The opaque dispersion was subjected to washing operations and drying operations in substantially the same manner as in Example 1 to thereby obtain white solids. The water absorptivity of the obtained white solids was measured in substantially the same manner as in Example 1, and found to be 10 in terms of the weight ratio of the water-containing solids after the third washing operation to the dried solids obtained by drying the above-mentioned water-containing solids. The organic domain/inorganic domain weight ratio was found to be less than 1.0 (specifically, 0.98).

The obtained white solids were subjected to infrared spectroscopy. As a result, an absorbance peak at 970 $cm^{-1}$ (which is ascribed to an —O—Si—O— linkage) and an absorbance peak at 1,560 $cm^{-1}$ (which is ascribed to the carbonyl moiety of a carboxyl group) were observed Thus, it was confirmed that the functional groups of the polyacrylic acid were ionically bonded to the —O—Si—O— linkages through calcium atoms.

The transparency of the white solids was evaluated in accordance with the above-mentioned method. As a result, it was found that the white solids were dispersed in water and the resultant dispersion was not transparent.

Further, the pH-response property of the white solids was evaluated as follows. 1 g of the white solids was added to 5 g of a 2 N hydrochloric acid, with the result that the white solids were dissolved in the hydrochloric acid. To the resultant solution was added 5 g of a 2 N aqueous sodium hydroxide solution, with the result that an opaque dispersion was obtained. Thus, the white solids had an pH-response property. However, as mentioned above, the white solids had an organic domain/inorganic domain weight ratio of less than 1 and, hence, as mentioned above, the water absorptivity of the white solids was poor.

The production conditions and the results of the measurements are shown in Table 1.

TABLE 1

| | Water-soluble polymer | Mw | Source for silicon | Source for the divalent atom | Divalent metal introduced | Al | pH |
|---|---|---|---|---|---|---|---|
| Example 1 | Polyacrylic acid X | 500,000 | $Na_2SiO_3$ | $Ca(NO_3)_2$ | Ca | Not used | 12 |
| Example 2 | Copolymer Y | 400,000 | $Na_2SiO_3$ | $Ca(NO_3)_2$ | Ca | Not used | 12 |
| Example 3 | Polyacrylic acid X | 500,000 | $Na_2SiO_3$ | $Ca(NO_3)_2$ | Ca | Used | 11 |
| Example 4 | Copolymer Z | 150,000 | $Na_2SiO_3$ | $Ca(NO_3)_2$ | Ca | Not used | 12 |
| Example 5 | Copolymer Y | 400,000 | $Na_2SiO_3$ | $Mg(NO_3)_2$ | Mg | Not used | 12 |
| Example 6 | Polyacrylic acid X | 500,000 | $Na_2SiO_3$ | $Ca(NO_3)_2$ | Ca | Not used | 12 |
| Example 7 | Polyacrylic acid AC10SH | 1,500,000 | $Na_2SiO_3$ | $Ca(NO_3)_2$ | Ca | Not used | 12 |
| Example 8 | Polyacrylic acid AC10H | 300,000 | $Na_2SiO_3$ | $Ca(NO_3)_2$ | Ca | Not used | 12 |
| Example 9 | Polyacrylic acid AC10M | 150,000 | $Na_2SiO_3$ | $Ca(NO_3)_2$ | Ca | Not used | 12 |
| Example 10 | Polyacrylic acid AC10SH | 1,500,000 | $Na_2SiO_3$ | $CuSO_4$ | Cu | Not used | 11 |
| Example 11 | Polyacrylic acid AC10SH | 1,500,000 | $Na_2SiO_3$ | $Ni(NO_3)_2$ | Ni | Not used | 12 |
| Example 12 | Polyacrylic acid AC10SH | 1,500,000 | Colloidal silica | $Ca(NO_3)_2$ | Ca | Not used | 9 |
| Example 13 | Soldium Alginate | 250,000 | $Na_2SiO_2$ | $Ca(NO_3)_2$ | Ca | Not used | 12 |
| Example 14 | Polyacrylic acid AC10SH | 1,500,000 | $Na_2SiO_2$ | $Ca(NO_3)_2$ | Ca | Not used | 12 |
| Example 15 | Polyacrylic acid AC10SH | 1,500,000 | $Na_2SiO_2$ | $Ca(NO_3)_2$ | Ca | Not used | 12 |
| Example 16 | Polyacrylic acid AC10SH | 1,500,000 | $Na_2SiO_2$ | $Ca(NO_3)_2$ | Ca | Not used | >13 |
| Comparative Example 1 | Crosslinked polyacrylic acid | Not measurable | Not used | Not used | Not used | Not used | Not measured |
| Comparative Example 2 | Polyacrylic acid X | 500,000 | Not used | $Ca(NO_3)_2$ | Ca | Not used | 11 |
| Comparative Example 3 | Polyacrylic acid X | 500,000 | $Na_2SiO_2$ | Not used | Not used | Not used | Varied |
| Comparative Example 4 | Copolymer Y | 400,000 | Calcium montmorillonite | | Not used | Used | 12 |
| Comparative Example 5 | Copolymer Y | 400,000 | Sodium montmorillonite | | Not used | Used | 12 |
| Comparative Example 6 | Polyacrylic acid AC10H | 300,000 | CSH prepared in advance | | Ca | Not used | 12 |
| Comparative Example 7 | Polyacrylic acid AC10SH | 1,500,000 | Synthesized calcium silicate | | Ca | Not used | 12 |
| Comparative Example 8 | Polyacrylic acid | 90,000 | $Na_2SiO_3$ | $Ca(NO_3)_2$ | Ca | Not used | >13 |

| | IR absorbance ascribed to —O—Si—O— linkage | Ionic bond | Organic domain/Inorganic domain weight ratio | Transparency | Water absorptivity (times) | pH-response property |
|---|---|---|---|---|---|---|
| Example 1 | 970 | Present | 1.9 | Yes | 25 | Yes |
| Example 2 | 970 | Present | 1.6 | Yes | 20 | Yes |
| Example 3 | 970 | Present | 1.8 | Yes | 22 | Yes |
| Example 4 | 970 | Present | 2.0 | Yes | 16 | Yes |
| Example 5 | 1,040 | Present | 1.9 | Yes | 23 | Yes |
| Example 6 | 970 | Present | 1.9 | Yes | 25 | Yes |

TABLE 1-continued

| | | | | | | |
|---|---|---|---|---|---|---|
| Example 7 | 970 | Present | 1.9 | Yes | 26 | Yes |
| Example 8 | 970 | Present | 1.9 | Yes | 24 | Yes |
| Example 9 | 970 | Present | 1.8 | Yes | 20 | Yes |
| Example 10 | 1,010 | Present | 1.1 | Yes | 37 | Yes |
| Example 11 | 1,040 | Present | 1.2 | Yes | 20 | Yes |
| Example 12 | 970 | Present | 1.9 | Yes | 25 | Yes |
| Example 13 | 970 | Present | 2.0 | Yes | 42 | Yes |
| Example 14 | 970 | Present | 1.3 | Yes | 18 | Yes |
| Example 15 | 970 | Present | 1.3 | Yes | 35 | Yes |
| Example 16 | 970 | Present | 1.5 | No | 13 | Yes |
| Comparative Example 1 | Not observed | Not present | Not measured | Yes | $\geq 20$ | No |
| Comparative Example 2 | Not observed | Present | 1.3 | No | About 1 | Yes |
| Comparative Example 3 | Not observed | Not present | Not measurable | Yes | Not measurable | No |
| Comparative Example 4 | 1,040 | Not present | Nearly 0 | No | 3 | No |
| Comparative Example 5 | 1,040 | Not present | Nearly 0 | No | 6 | No |
| Comparative Example 6 | 970 | Present | 0.7 | No | 12 | Yes |
| Comparative Example 7 | 970 | Present | 0.2 | No | 9 | Yes |
| Comparative Example 8 | 970 | Present | 0.98 | No | 10 | Yes |

EXAMPLE 17

To 5 g of a 10% by weight aqueous solution of a polyacrylic acid (JURYMER AC-10H, manufactured and sold by NIHON JUNYAKU CO., LTD., Japan; weight average molecular weight: 300,000) were added, in this order, 2.78 g of a 10% by weight aqueous solution of sodium hydroxide and 3.95 g of a 10% by weight aqueous solution of sodium metasilicate nonahydrate, followed by stirring for 10 minutes, thereby obtaining a liquid mixture. Using bar coater #16, the obtained liquid mixture was applied to the surface of an aluminum substrate which has been subjected to anodic oxidation, followed by drying at 80° C. for 5 minutes, thereby forming a coating on the aluminum substrate. The aluminum substrate having the coating formed thereon was immersed for 3 minutes in 400 g of a 10% by weight aqueous solution of calcium nitrate tetrahydrate which had separately been prepared, followed by immersion in purified water for 20 seconds to wash the coating. From the resultant coating was removed water, followed by drying at 60° C. for 5 minutes. To the resultant dried coating was dropped waterdrop. As a result, it was observed that the waterdrop immediately spread on the coating. Thus, it was confirmed that the coating had a very high hydrophilicity.

EXAMPLE 18

Using bar coater #16, an acryl latex (Z510, manufactured and sold by ASAHI CHEMICAL INDUSTRY CO., LTD., Japan) was applied to the surface of an aluminum substrate which has been subjected to anodic oxidation, followed by drying at 60° C. for 5 minutes, thereby forming an acryl latex coating on the aluminum substrate. Separately, to 150 g of a 10% by weight aqueous solution of sodium metasilicate nonahydrate were added, in this order, 106.6 g of a 1 N hydrochloric acid and 525 g of a 10% by weight aqueous solution of calcium nitrate tetrahydrate while stirring, thereby obtaining hydrophilicity-imparting liquid M. The above-mentioned aluminum substrate having formed thereon the acryl latex coating was immersed in the obtained hydrophilicity-imparting liquid M for 1 minute, followed by immersion in purified water for 20 seconds to wash the coating. From the resultant coating was removed water, followed by drying at 60° C. for 5 minutes. To the resultant dried coating was dropped waterdrop. As a result, it was observed that the waterdrop immediately spread on the coating. Thus, it was confirmed that the coating had a very high hydrophllicity.

Comparative Example 9

Substantially the same procedure as in Example 18 was repeated, except that neither sodium metasilicate nonahydrate nor hydrochloric acid was used. thereby forming a coating on a substrate. The hydrophilicity of the coating was evaluated in the same manner as in Example 18. As a result, it was confirmed that the formed coating repelled water and, thus, had no hydrophilicity.

Industrial Applicability

The organic domain/inorganic domain hybrid material of the present invention is advantageous not only in that the material exhibits excellent water absorptivity, but also in that the material exhibits a pH-response property (i.e., a characteristic wherein decomposition and regeneration of the material occur depending on pH), so that the material can be easily decomposed into the components thereof. Therefore. when the material is used as a water absorptive material and the like, not only can the material after use be easily disposed by decomposing the material, but also the components obtained by decomposition of the material can be easily recycled, so that the hybrid material of the present invention is advantageous from the viewpoint of prevention of environmental destruction and efficient utilization of resources.

What is claimed:

1. An organic domain/inorganic domain hybrid material comprising:
    an organic domain comprising at least one water-soluble or water-dispersible organic polymer having a plurality of functional groups selected from the group consisting of anionic functional groups and nonionic functional groups and optionally having at least one cationic functional group, and an inorganic domain, said organic domain and said inorganic domain are ionically bonded to each other through said functional groups of the organic polymer to form an ionically crosslinked structure, said inorganic domain comprising a plurality of inorganic bridges, each of which independently comprises at least one silicon (Si) atom, at least two oxygen (O) atoms and at least two divalent metal atoms, wherein said at least one silicon atom and said at least two oxygen atoms together form at least one —O—Si—O— linkage, in which said at least one —O—Si—O— linkage is arranged longitudinally of the inorganic bridge, wherein each terminal of the inorganic bridge comprises said divalent metal atom, wherein the divalent metal atom is ionically bonded to said —O—Si—O— linkage of the inorganic bridge and to said functional group of the organic polymer, so that said ionically crosslinked structure is formed, wherein, when said inorganic bridge comprises at least two —O—Si—O— linkages, the two —O—Si—O— linkages optionally have a divalent metal atom which is positioned therebetween and which is ionically bonded to oxygen atoms of the —O—Si—O— linkages positioned adjacently to said divalent metal atom, respectively, wherein laterally, mutually adjacent inorganic bridges of said plurality of inorganic bridges are optionally linked to each other at their respective silicon atoms through at least an oxygen atom, and wherein the weight ratio of said organic domain to said inorganic domain is at least 1.0.

2. The hybrid material according to claim 1, wherein said functional groups of the organic polymer are anionic functional groups selected from the group consisting of a carboxylic acid group or a salt thereof, a sulfonic acid group or a salt thereof, a phosphoric acid group or a salt thereof and mixtures thereof.

3. The hybrid material according to claim 1, wherein said inorganic domain has a size of 100 nm or less in terms of the length of the long axis of said inorganic domain.

4. The hybrid material according to claim 1, which is substantially transparent when the hybrid material has water mixed therewith in an amount which is 9 times as large as the dry weight of the hybrid material.

5. The hybrid material according to claim 1, wherein said divalent metal atoms are alkaline earth metal atoms.

6. The hybrid material according to claim 1, wherein 1 to 15 atomic % of the silicon atoms are replaced by aluminum atoms.

7. The hybrid material according to claim 1, which is produced by a process comprising contacting, in the presence of an aqueous medium and at a pH of 7 or more, the following chemical species (a), (b), (c) and option ally (d) with each other:

(a) silicate anions formed from a silicate compound or a silicon halide, (b) polymer anions formed from a water-soluble or water-dispersible organic polymer having a plurality of functional groups selected from the group consisting of anionic functional groups and nonionic functional groups, and optionally at least one cationic functional group.

(c) divalent anions formed from a divalent metal salt, and optionally (d) aluminate anions formed from an aluminum compound.

8. A hydrophilic coating comprising the hybrid material of any one of claims 1 to 7.

9. A hydrophilic coating comprising:

a lower organic layer comprised of a water-dispersible organic polymer having a plurality of functional groups selected from the group consisting of anionic functional groups and nonionic functional groups and optionally having at least one cationic functional group, and an upper inorganic layer which is formed over said organic layer, wherein said inorganic layer comprises a plurality of inorganic molecules selected from the group consisting of inorganic ring-forming molecules and inorganic free-end molecules, each of said inorganic ring-forming molecules independently comprising at least one silicon (Si) atom, at least two oxygen (O) atoms and at least two divalent metal atoms, wherein said at least one silicon atom and said at least two oxygen atoms together form at least one —O—Si—O— linkage, and in which said at least one —O—Si—O— linkage is arranged longitudinally of the inorganic ring-forming molecule, wherein each terminal of the inorganic ring-forming molecule comprises said divalent metal atom, wherein the divalent metal atom is ionically bonded to said —O—Si—O— linkage of the inorganic ring-forming molecule and to said functional group of the organic polymer, wherein, when said inorganic ring-forming molecule comprises at least two —O—Si—O— linkages, the two —O—Si—O— linkages optionally have a divalent metal atom which is positioned therebetween and which is ionically bonded to oxygen atoms of the —O—Si—O— linkages positioned adjacently to said divalent metal atom, respectively, and each of said inorganic free-end molecules independently comprising at least one silicon (Si) atom, at least two oxygen (O) atoms and at least one divalent metal atom, wherein said at least one silicon atom and said at least two oxygen atoms together form at least one —O—Si—O— linkage, in which said at least one —O—Si—O— linkage is arranged longitudinally of the inorganic free-end molecule, wherein a non-free-end terminal of the inorganic free-end molecule comprises said divalent metal atom, wherein the divalent metal atom is ionically bonded to said —O—Si—O— linkage of the inorganic free-end molecule and to said functional group of the organic polymer, wherein, when said inorganic free-end molecule comprises at least two —O—Si—O— linkages, the two —O—Si—O— linkages optionally have a divalent metal atom which is positioned therebetween and which is ionically bonded to oxygen atoms of the —O—Si—O— linkages positioned adjacently to said divalent metal atom, respectively, and wherein laterally, mutually adjacent inorganic molecules of said plurality of inorganic molecules are optionally linked to each other at their respective silicon atoms through at least an oxygen atom.

* * * * *

UNITED STATES PATENT AND TRADEMARK OFFICE
CERTIFICATE OF CORRECTION

PATENT NO.    : 6,620,516 B1
DATED         : September 16, 2003
INVENTOR(S)   : Masaaki Kurihara and Hiroyoshi Matsuyama It is certified that error appears in the above-identified patent and that said Letters Patent is hereby corrected as shown below:

Drawings,
Sheet 4, Fig. 4, the right hand group which reads:

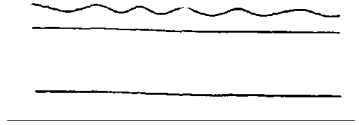

Should read

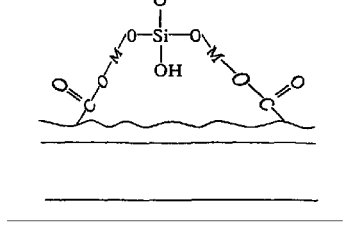

Signed and Sealed this

Twenty-fourth Day of August, 2004

*JON W. DUDAS*
*Director of the United States Patent and Trademark Office*